US007005074B2

(12) United States Patent
Nguyen et al.

(10) Patent No.: US 7,005,074 B2
(45) Date of Patent: Feb. 28, 2006

(54) BALLAST WATER TREATMENT SYSTEMS INCLUDING RELATED APPARATUS AND METHODS

(76) Inventors: Hap Nguyen, 15391 Purdy St., Westminster, CA (US) 92683; William Murray Fowler, 244 B Ogle St., Costa Mesa, CA (US) 92627; Howard Roop, 3400 Wimbledon, Costa Mesa, CA (US) 92626; Ronald Yoshio Nishida, 122 Avenida De Diamante, Arroyo Grande, CA (US) 93420

( * ) Notice: Subject to any disclaimer, the term of this patent is extended or adjusted under 35 U.S.C. 154(b) by 151 days.

(21) Appl. No.: 10/610,328

(22) Filed: Jun. 28, 2003

(65) Prior Publication Data

US 2004/0055966 A1 Mar. 25, 2004

Related U.S. Application Data

(60) Provisional application No. 60/392,388, filed on Jun. 29, 2002.

(51) Int. Cl.
*C02F 1/32* (2006.01)
*B63B 13/00* (2006.01)

(52) U.S. Cl. ....................... 210/748; 210/764; 210/767; 210/205; 210/242.1

(58) Field of Classification Search ................. 210/748, 210/764, 767, 198.1, 205, 251, 242.1, 241; 114/121, 125, 382; 250/432 R, 436; 422/24, 422/186.3

See application file for complete search history.

(56) References Cited

U.S. PATENT DOCUMENTS

| | | | | | |
|---|---|---|---|---|---|
| 5,427,693 | A | * | 6/1995 | Mausgrover et al. | 210/739 |
| 5,578,116 | A | * | 11/1996 | Chang | 96/194 |
| 6,080,313 | A | * | 6/2000 | Kelada | 210/631 |
| 6,171,508 | B1 | * | 1/2001 | Browning, Jr. | 210/750 |
| 6,464,884 | B1 | * | 10/2002 | Gadgil | 210/748 |
| 6,613,232 | B1 | * | 9/2003 | Chesner et al. | 210/650 |

* cited by examiner

*Primary Examiner*—Frank M. Lawrence
(74) *Attorney, Agent, or Firm*—DB Technical Consulting; Donald Bollella

(57) ABSTRACT

Ballast water treatment apparatus and methods for preventing foreign aquatic invasive species form entering marine ecological zones by translocation in ship's ballast water. The apparatus includes a housing, a filter member, and UV water treatment chambers. Methods include use of a ship's fire hydrant system for moving ballast water from the ship's ballast tanks into the apparatus for filtration and treatment. In-port service vessels and dock-side service vehicles are equipped with the treatment and filtration apparatus to provided in-port or dock-side ballast water treatment services. Related methods are also provided.

16 Claims, 19 Drawing Sheets

BALLAST WATER TREATMENT SYSTEMS INCLUDING RELATED APPARATUS AND METHODS

CROSS-REFERENCE TO RELATED APPLICATIONS

The present application claims the benefit of priority from U.S. Provisional Application Ser. No. 60/392,388 filed Jun. 29, 2002 which is herein incorporated by reference in its entirety.

BACKGROUND OF THE INVENTION

1. Field of the Invention

This invention relates in general to water treatment and, in particular, to ballast water treatment for ships. More specifically, but without restriction to the particular embodiments hereinafter described in accordance with the best mode of practice, this invention relates to in-port water treatment systems directed to filtering ballast water and deactivating biological material to prevent translocation of aquatic invasive species.

2. General Discussion and Related Art

Over the past 25 years, the introduction of foreign aquatic invasive species (AIS) into ports and waterways has increased significantly throughout the globe. Ships from around the world pump 40,000 gallons of foreign ballast water into U.S. waterways every minute.

This discharged ballast water contains countless species of foreign marine life including fish, shellfish, plants, and microorganisms. More than 200 AIS are now established in the San Francisco Bay and Delta areas in California and 150 AIS in the Great Lakes of North America alone.

Many of these foreign AIS are disrupting the local marine ecosystems. Invading organisms are steadily replacing native species by competition or predation. Viruses and bacteria carried in ships ballast water have the potential to cause the destruction of native species as well as create human health problems.

The Zebra Mussel, Chinese Mitten Crab, Sea Lamprey, and Purple Loosestrife are just some of the AIS causing serious and costly problems globally by clogging canals and water intake and/or outlet systems. Billions of dollars have been spent on problems arising from these organisms. The primary source comes from the discharge of ships' ballast water, taken in as ballast in one port then discharged into another port.

Globally, there are seven major marine ecological zones, each having distinct marine species which have evolved in those zones over many millennia. In recent years, however, there has been significant displacement of indigenous species from one zone to other zones around the globe. Today, no country has escaped from the widespread impact of aquatic invasive species arriving from other marine environments. In many instances, these translocated species have prospered in their newly found environment with damaging economic and ecological consequences. According to recent studies conducted by marine scientists, the most significant contributing factor for these undesired re-locations is the discharge of ballast water contained in vessels of commerce. Typically, an ocean going vessel takes sea water into its ballast tanks prior to departing its port of origin to stabilize the vessel during its voyage. This ballast water from the home port may then be discharged at ports of call in other ecological locations. Currently at least 162 non-indigenous aquatic species have colonized the Great Lakes alone. Thus far, the economically most significant aquatic invader to arrive in the Great Lakes system is the zebra mussel. A 1988 import from the Black Sea, the zebra mussel has become an economic and ecological disaster region. In addition to ecologically contaminating the Great Lakes, the zebra mussel is now spreading rapidly to other waters within the United States in spite of massive efforts and methodology deployed to control this invasive species. For all foreign aquatic species invading United States waters, the U.S. Coast Guard estimates the collective domestic economic impact of these undesired AIS arrivals at more than $7.3 billion per year.

The world's nations and different states of the United States are responding to this threat by promoting treaties and state legislation directed to setting standards for halting the spread of aquatic invasive species. On the international front, the International Maritime Organization (IMO) is developing an IMO Convention relating to ballast water management requirements. This Convention is expected to be signed within a few years then ratified by national legislative bodies and entered into force as domestic law in several of the world's nations. It is currently anticipated that after the year 2008, all international trading vessels using seawater as ships ballast will fall under the IMO Convention. Royal Haskoning Report, Global Market Analysis of Ballast Water Treatment Technology, Oct. 24, 2001, Reference No. 42810/001R/HSC/SKO.

On the U.S. domestic front, the states of Washington and California are leading state legislative development efforts directed to regulating the discharge of ballast water into their respective state ports. These regulations are technical in nature and will provide specific standards relative to the discharge of particulate matter and active biological organisms.

Prior to current state legislative activities and collective international concern, the shipping industry had shown an acceptable degree of compliance to pre-existing standards. However AIS are still being introduced into the world's ports and waterways. Thus prior standards and technical measures implemented over the past years have proven inadequate. Currently, no known economically viable system has been found to prevent these organisms from entering or leaving ships' ballast water tanks.

Some of the prior methods and devices that have been employed in an attempt to control the AIS problem include (1) the mid-ocean ballast water exchange method, (2) ozone and nitrogen systems, (3) cyclone systems, (4) heat systems, and (5) use of biocides. These prior methods and systems are briefly described in further detail immediately herein below.

Mid-ocean Ballast Water Exchange: The U.S. Congress has passed legislation requiring ships carrying ballast water from foreign ports to exchange this point-of-origin ballast water with mid-ocean sea water before entering the Great Lakes. This method has not proven effective in killing freshwater organisms. Very small quantities of survivors, one per several thousand, were found sufficient to start an invasion.

Ozone and Nitrogen Systems: These gases, when introduced to the ship's ballast water, were found to be effective in controlling bacteria and other small organisms. However, they have proven to be less effective at controlling adult crustaceans and fish. Other disadvantages of these systems include those next enumerated. (1) Problems of uniformity in mixing the gases with the ballast water. Several days are required to kill the organisms. Ballast water exchange sometimes takes place within several hours. (2) Unable to treat the organisms in the sediments which are disturbed during ballasting. (3) Requires modification to the ship and significant space on board for system installation. (4) High cost.

Cyclone Systems: Water drawn into the system for ballasting is spun to remove organisms. The filtered water is allowed to flow into the ballast tanks and the removed organisms and unfiltered water returned to its source. These types of systems are capable of removing sediments, large particles, and some organisms. The disadvantages of these systems include the following. (1) Centrifugation does not work effectively with organisms that have densities close to that of water. (2) The system is prone to clogging and must be back flushed to clean. (3) An inability to treat or remove organisms that passed through the system. Once in the ballast tanks, these organisms may continue to grow and multiply. (4) Requires modification to the ship and significant space on board for system installation. (5) High cost.

Heat Systems: Heat energy high enough to kill organisms is added to the ballast water. Disadvantages of these systems are next briefly listed. (1) Huge quantity of energy is required to raise the temperature high enough to kill organisms. The energy required to kill bacteria and viruses make this system impractical for ballast water treatment. (2) Problems of uniformity in mixing the heated water with the ballast water, requiring many hours to kill the organisms. Ballast water exchange may have to take place within several hours. (3) Enough energy to run the system may not be available from the ship's power system. (4) High cost to install and operate.

Use of Biocides: Biocides such as vitamin K and chlorine are effective at killing AIS when added to the ballast water. Disadvantages of these systems include the following. (1) Problems of uniformity in mixing the biocide with the ballast water, requiring many hours to kill the organisms. Ballast water exchange may have to take place within several hours. (2) Some bacteria and viruses may not be killed by the biocides used. (3) Treated ballast water may be toxic to the environment when discharged.

In addition to the above technical limitations and cost considerations, none of the known prior art ballast water treatment systems will meet the newly emerging regulatory standards. Therefore it is desired to provide a cost effective, technically efficient ballast water treatment system that is acceptable by the marine shipping industry and that satisfies the emerging more stringent regulatory standards.

SUMMARY OF THE INVENTION

It is, therefore, an object of the present invention to improve ballast water treatment systems in a cost effective and technically efficient manner that also meets the anticipated future standards of currently developing legislative mandates. These and many other objects and advantages are attained in accordance with the present invention wherein there is provided a portable deck apparatus for treating ballast water discharged from the fire hydrant system of a ship. Different embodiments of the apparatus are provided.

According to another aspect of the present invention, there is provided a method of distributing portable water treatment devices around the deck of a ship to process ballast water discharged from the fire hydrant system of the ship.

In accordance with another aspect of this invention, there is also provided a built-in water treatment assembly for processing ballast water discharged from the fire hydrant system of a ship. This assembly is manufactured and installed during the ship building process rather than adapted as a retro-fit device or intended for use on pre-existing ships. There also provided methods related to this built-in water treatment aspects of the present invention.

According to yet another aspect of the present invention there is further provided a marine service vessel for treating discharged ballast water from a ship. Related methods include a method of treating discharged ballast water from a ship using the in-port marine service vessel and methods of deriving financial revenue for services provided for treating discharged ballast water from a ship using the in-port service vessel of the present invention.

In accordance with still yet another aspect of this invention, the inventors hereof have also provided a dock-side service vehicle for treating discharged ballast water from a ship in port. Related methods include a method of treating discharged ballast water from a ship using the dock-side service vehicle and methods of deriving financial revenue for services provided for treating discharged ballast water from a ship using the dock-side service vehicle as out-fitted according to the teachings of the present disclosure.

In addition to the above, the present invention further provides methods for processing, filtering, or treating ballast water discharged from a ship, and related methods directed to using the fire hydrant system of a ship to process, filter, or treat ballast water before directing the ballast water into an open water environment to thereby protect the environment form undesired aquatic invasive species.

More particularly, the present invention is directed to a portable deck apparatus for treating ballast water discharged from the fire hydrant system of a ship. This apparatus includes (1) a housing having at least one inlet port and one discharge port, the at least one inlet port being adapted to receive ballast water from the fire hydrant system of a ship, (2) a filter positioned within the housing, the filter employed to filter particulate matter from the ballast water received from the fire hydrant system, and (3) a source of electromagnetic radiation maintained within the housing for irradiating the ballast water to thereby deactivate biological organisms contained therein.

According to another aspect of the present invention there is provided a method of distributing portable water treatment devices around the deck of a ship to process ballast water discharged from the fire hydrant system of the ship, each of the water treatment devices having a known processing rate. This method includes the steps of (1) determining the number and location of fire hydrant outlets on the deck of a ship, (2) ascertaining the flow rate of each of the located fire hydrant outlets, (3) determining an amount of the ship's ballast water requiring treatment, (4) setting a maximum duration of time during which the determined amount of ballast water requiring treatment is to be processed, (5) determining the number of water treatment devices necessary to process the determined amount of ballast water within the maximum duration of time, and (6) distributing the determined number of water treatment devices around the deck of the ship proximate selected fire hydrant outlets to direct ballast water from the fire hydrant outlets into respective water treatment devices for processing.

In accordance with yet another aspect of the present invention, there is further provided a marine service vessel for treating discharged ballast water from a ship. This vessel includes a water treatment processing area accessible to a respective ship docked in port; a housing tank positioned within the water treatment processing area, the housing tank having at least one inlet port and one discharge port, the at least one inlet port being adapted to receive ballast water from the fire hydrant system of the respective ship by connecting a fire hose between a fire hydrant on the respective ship and the at least one inlet port of the housing tank; a filter positioned within the housing tank, the filter employed to filter particulate matter from the ballast water received from the respective ship's fire hydrant system; and a source of electromagnetic radiation maintained within the housing tank for irradiating the ballast water to thereby deactivate biological organisms contained therein.

According to certain methods of the present invention associated with the service vessel aspect thereof, there is further provided a method of treating discharged ballast water from a ship using an in-port service vessel. This method includes the steps of (1) providing a ballast water treatment apparatus on board the service vessel, (2) positioning the service vessel adjacent a respective ship requiring ballast water treatment, (3) and directing ballast water from a ballast tank of the respective ship into the ballast water treatment apparatus on board the service vessel to thereby treat the respective ship's ballast water before discharging the ship's ballast water. In this method, the respective ship's ballast water is directed from the ballast tank through the ship's fire hydrant system and into the ballast water treatment apparatus on board the service vessel. The method may include the further step of connecting at least one fire hose between a fire hydrant outlet on a deck of the respective ship and an inlet port provided on the ballast water treatment apparatus on board the service vessel.

According to the business method aspects of the present invention, there is provided a method of deriving financial revenue for services provided for treating discharged ballast water from a ship using an in-port service vessel. This method includes the steps of positioning the service vessel adjacent a respective ship requiring ballast water treatment; directing ballast water from a ballast tank of a respective ship into a ballast water treatment apparatus maintained on board the service vessel to thereby treat the respective ship's ballast water before discharging the ship's ballast water into the environment; determining an amount of time required to treat the respective ship's ballast water; and calculating a water treatment service fee based on the amount of time required to treat the respective ship's ballast water.

In accordance with yet another aspect of the present invention, there is further provided another method of deriving financial revenue for services provided for treating discharged ballast water from a ship using an in-port service vessel. This method includes the steps of positioning the service vessel adjacent a respective ship requiring ballast water treatment; directing ballast water from a ballast tank of a respective ship into a ballast water treatment apparatus maintained on board the service vessel to thereby treat the respective ship's ballast water before discharging the ship's ballast water into the environment; determining a total volume of treated ballast water processed from the respective ship's ballast water tanks; and calculating a water treatment service fee based on the total volume of treated ballast water.

According to still yet another aspect of the present invention, there is also provided a dock-side service vehicle for treating discharged ballast water from a ship in port. This vehicle may advantageously include a water treatment processing platform accessible to a respective ship docked in port; a housing tank positioned within the water treatment processing platform, the housing tank having at least one inlet port and one discharge port, the at least one inlet port being adapted to receive ballast water from the fire hydrant system of the respective ship by connecting a fire hose between a fire hydrant on the respective ship and the at least one inlet port of the housing tank; a filter positioned within the housing tank, the filter employed to filter particulate matter from the ballast water received from the respective ship's fire hydrant system; and a source of electromagnetic radiation maintained within the housing tank for irradiating the ballast water to thereby deactivate biological organisms contained therein.

A method of treating discharged ballast water from a ship using a dock-side service vehicle is also provided. This method includes the steps of providing a ballast water treatment apparatus on the dock-side service vehicle; positioning the service vehicle adjacent a respective ship requiring ballast water treatment; and directing ballast water from a ballast tank of the respective ship into the ballast water treatment apparatus on the dock-side service vehicle to thereby treat the respective ship's ballast water before discharging the ship's ballast water into an open water environment. In this method, the respective ship's ballast water may be directed from the ballast tank through the ship's fire hydrant system and into the ballast water treatment apparatus on the dock-side service vehicle. The method may further include the further step of connecting at least one fire hose between a fire hydrant outlet on a deck of the respective ship and an inlet port provided on the ballast water treatment apparatus on the dock-side service vehicle.

There is still also provided a method of deriving financial revenue for services provided for treating discharged ballast water from a ship using a dock-side service vehicle. This method includes the steps of (1) positioning the dock-side service vehicle adjacent a respective ship requiring ballast water treatment, (2) directing ballast water from a ballast tank of a respective ship into a ballast water treatment apparatus maintained on the dockside service vehicle to thereby treat the respective ship's ballast water before discharging the ship's ballast water into an open environment, (3) determining an amount of time required to treat the respective ship's ballast water, and (4) calculating a water treatment service fee based on the amount of time required to treat the respective ship's ballast water.

There is also provided another method of deriving financial revenue for services provided for treating discharged ballast water from a ship using a dock-side service vehicle. This method includes the steps of (1) positioning the dock-side service vehicle adjacent a respective ship requiring ballast water treatment, (2) directing ballast water from a ballast tank of a respective ship into a ballast water treatment apparatus maintained on the dockside service vehicle to thereby treat the respective ship's ballast water before discharging the ship's ballast water into an open environment, (3) determining a total volume of treated ballast water processed from the respective ship's ballast water tanks, and (4) calculating a water treatment service fee based on the total volume of treated ballast water.

According to yet a further aspect of this invention, there is also provided a method of processing ballast water discharged from a ship. This method includes the steps of accessing ballast water requiring treatment from a ship's ballast tank through a fire hydrant system of the ship, directing the ballast water from the fire hydrant system through a filter to thereby remove undesired particulate matter from the ballast water, and directing the filtered ballast water into an open water environment. This method may further include the step of directing electromagnetic radiation at the ballast water before directing the filtered ballast water into the open water environment to thereby deactivate biological organisms contained within ballast water.

There is yet still provided a method of using the fire hydrant system of a ship to treat ballast water. This method includes the steps of accessing ballast water requiring treatment from a ship's ballast tank through a fire hydrant located on a deck of the ship, directing the ballast water from the fire hydrant through a filter to thereby remove undesired particulate matter from the ballast water, and directing the filtered ballast water into an open water environment. This method may include the further step of directing electromagnetic radiation at the ballast water before directing the filtered ballast water into the open water environment to thereby deactivate biological organisms contained within ballast water.

BRIEF DESCRIPTION OF THE DRAWING

Further objects of the present invention together with additional features contributing thereto and advantages accruing therefrom will be apparent from the following description of preferred embodiments of the invention which are shown in the accompanying drawing with like reference numerals indicating like components throughout, wherein.

DETAILED DESCRIPTION OF THE INVENTION

Figure 1:
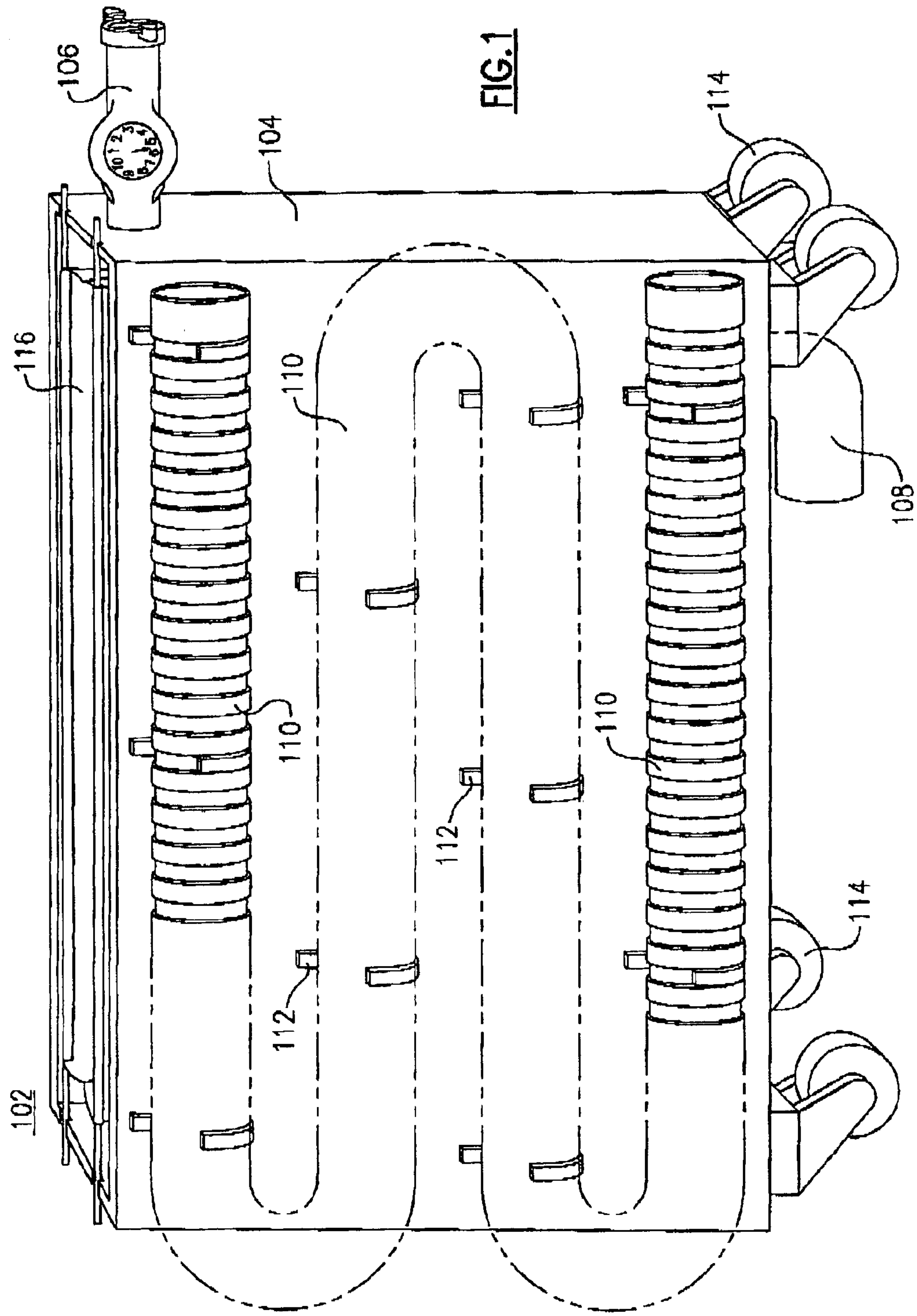
FIG. 1 is a perspective view of a one embodiment of a ballast water treatment apparatus according to the present invention.

With reference to FIG. 1, there is shown a ballast water treatment apparatus or device 102 according to the present invention. The ballast water treatment apparatus 102 includes a tank housing 104 as illustrated. The housing 104 includes an inlet port 106 having a gallon metered device as shown. The housing 104 further includes a discharge port 108. In the embodiment illustrated in FIG. 1, the housing member 104 is further provided with a discharge hose 110 mounted thereon by use of hook brackets 112. During use of the ballast water treatment apparatus 102 as described in further detail below, the discharge hose 110 is connected to the discharge port 108. With continuing reference to FIG. 1, there is further shown transport wheels 114 integrally arranged with the housing member 104 to thereby provide mobility during use of the apparatus on a ship's deck. As also shown in FIG. 1, the housing member 104 is provided with a filter apparatus which is discussed in further detail in connection with FIGS. 2–5.

Figure 2:
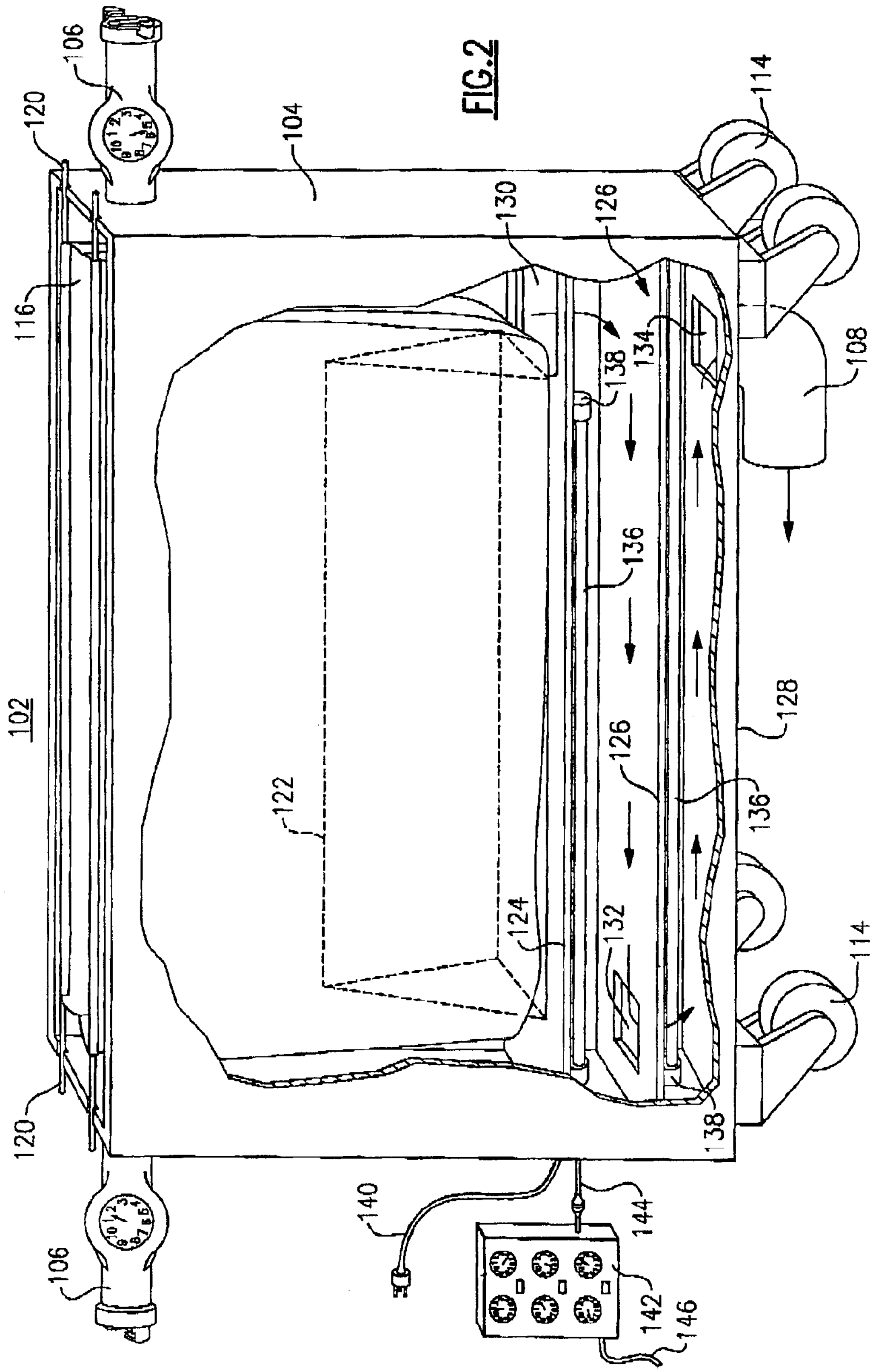
FIG. 2 is a view similar to FIG. 1 including a cut-away section to illustrate the interior of a more particular embodiment of the ballast water treatment apparatus according to this invention.

With reference now to FIG. 2, there is shown the filter apparatus 116 including a filter bag 118, support rods 120, and a support frame 122. The support frame 122 is positioned on a first platform 124 as illustrated. The first platform 124 divides the interior housing 124 into an upper filter chamber 125 and a lower treatment chamber. According to this embodiment of the present invention, there is also provided a second platform 126 positioned below the first platform 124 and above the bottom 128 of the housing 104. The first platform 124 fluidly isolates the upper filter chamber from the lower chambers. The first platform 124 includes a first flow aperture 130 which allows filtered water to pass from the upper chamber into a first lower flow channel formed between the first platform member 124 and the second platform member 126. As further illustrated in FIG. 2, the second platform member 126 includes a flow aperture 132 allowing fluid flow from the first treatment channel into the second treatment channel formed between the second platform 126 and the tank bottom 128. As further indicated by the arrows in FIG. 2 representing the direction of flow of ballast water through the ballast water treatment apparatus 102, the filtered water exits the housing 104 through a third flow aperture 134. As illustrated, water flow is through the aperture 134 in the tank bottom 128 and then through the discharge port 108.

As discussed above in conjunction with FIG. 1, during use of the device 102, the discharge hose 110 is connected to the discharge elbow 108 to direct filtered and treated water over the side of the ship as further discussed in detail below. As further illustrated in FIG. 2, each of the lower flow chambers includes at least one ultraviolet (UV) lamp 136 which is secured to either side of the housing 104 by UV lamp sockets 138. Each of the individual UV lamps 136 is provided with an electrical feedback connection 140 that connects into an electrical control box 132 as illustrated. The electrical control box 132 further includes an electrical power supply 134 that provides power to the UV lamps 136. Electrical power is provided to the control box 132 by an electrical connection 146 that connects to the ship's power supply. During use of the ballast water treatment apparatus 102, the control box 142 includes an hour meter to monitor and record UV bulb usage time. FIG. 2 illustrates one UV lamp in each of the lower treatment chambers. It would be readily understood by those of skill in the art, however, that a greater number of UV bulbs may be situated within these treatment chambers to provide additional electromagnetic UV energy into the chamber. Thus during the operation of the ballast water treatment apparatus 102, after the ballast water has passed through the filter bag 118, it is directed by gravity flow into the lower UV treatment chambers wherein electrical energy is applied to the UV bulbs and UV energy is directed in all directions into the flowing filtered water.

The UV energy is selected to be of sufficient power so that any micro-organisms or other biological organisms passing through the filter-bag 118 will be deactivated by the application of the UV energy. As used herein, "deactivation" means rendering any harmful or undesired biological organisms inactive in a manner that either kills the organisms, renders them unable to reproduce, or otherwise prevents them from causing harm to the open water environment into which the ballast water is discharged. The UV lamps utilized in one specific embodiment preferably number 8 in each chamber and are preferably 2000 watts (2 KW) with an operating voltage of 1,454 volts AC running at 1.35 amps. Thus in this embodiment of the present invention, UV radiation is principally employed to deactivate any biological organisms contained within the ballast water.

As further illustrated in FIG. 2, the ballast treatment apparatus 102 may be provided with two inlet ports 106 each having a respective gallon meter. In this alternate embodiment of the present invention, two supply hoses may be utilized from the ship's fire hydrant system to double the input flow into the apparatus 102 thereby decreasing the time required to filter and treat the ship's ballast water according to the various methods of the present invention discussed below in further detail.

Figure 3:
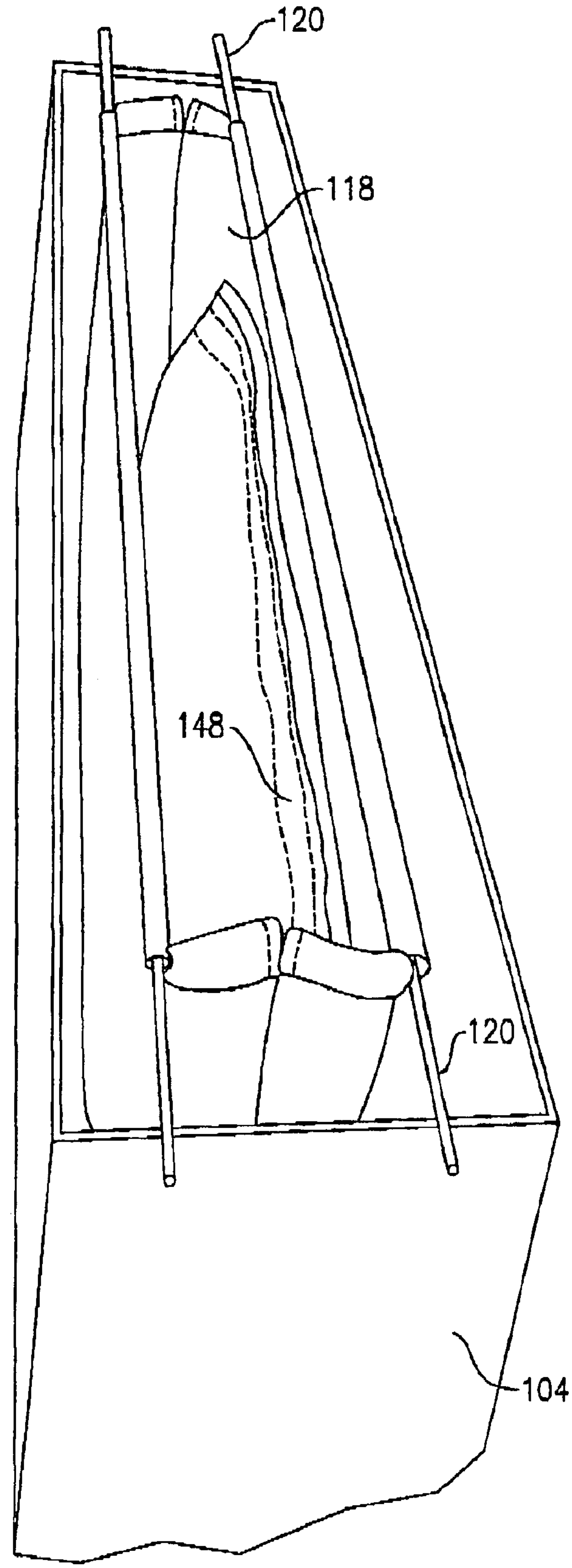
FIG. 3 is a top perspective view showing a filter bag assembly as employed in conjunction with different embodiments of the present invention.

With reference now to FIG. 3, there is shown a perspective top view of the ballast water treatment apparatus 102 according to the present invention. FIG. 3 also shows a top view of the filter apparatus 116 including filter bag 118 and support rods 120. As further shown in FIG. 3, the filter bag 118 is folded upwardly within the filter bag itself so that the bottom of the filter bag is situated some distance below the top edge of the filter bag 118. As further shown, the bottom of the filter bag 118 is provided with a change-filter indicator strip 148. In this manner, during use of the device when particulate matter is filtered from ballast water, the material forming the filter bag 118 will eventually collect an external layer of filtered particulate matter. As this layer of filtered particulate matter increases in thickness, the change-filter indicator strip 148 will eventually become fully covered by such filtered particulate matter. When this occurs, this is an indication that the filter bag 118 should be changed.

Figure 4:
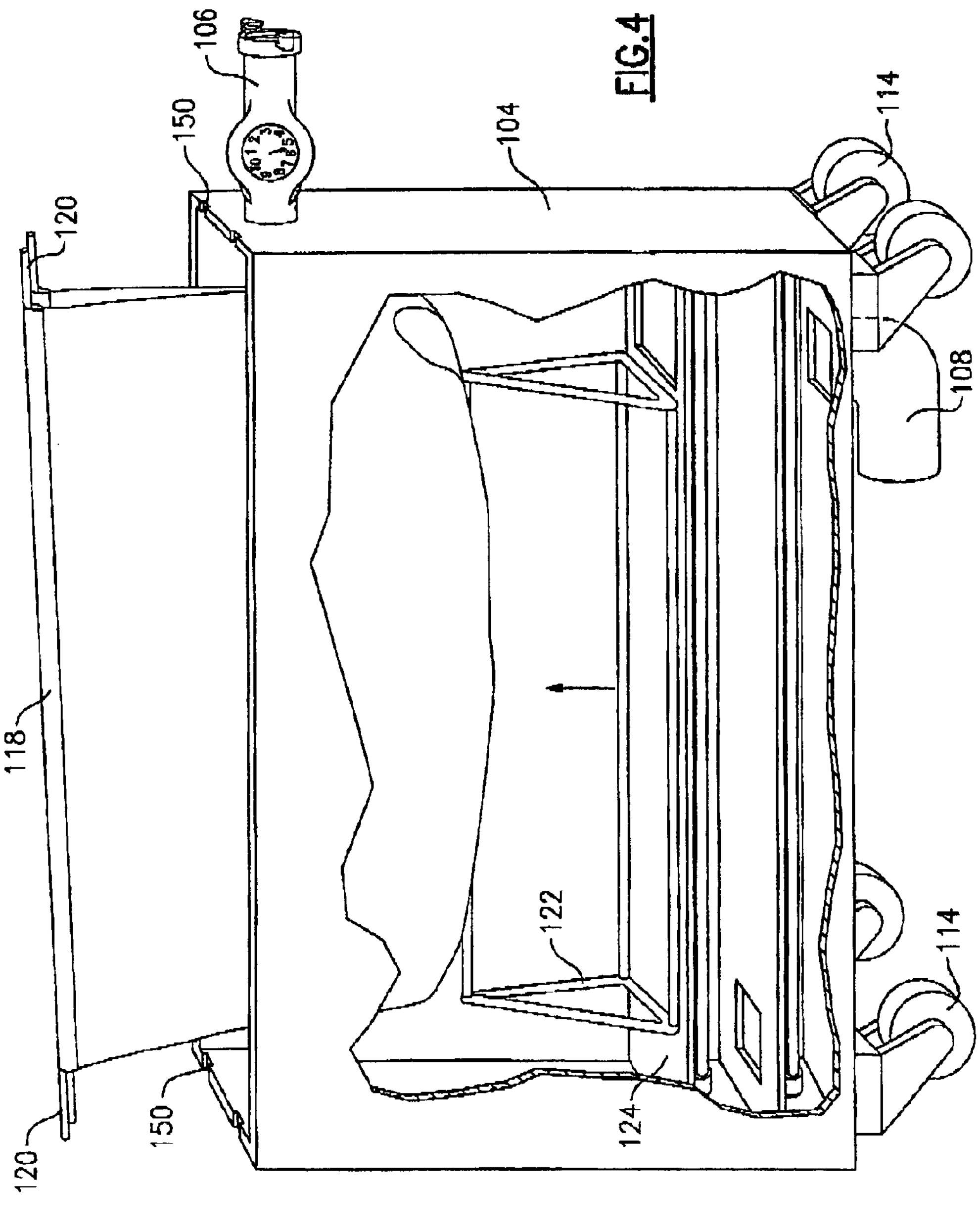
FIG. 4 is a perspective cut-away view showing a filter frame support structure according to one aspect of this invention and further illustrating removal of the filter bag assembly of FIG. 3.

FIG. 4 illustrates the process for changing the filter bag 118. As illustrated in FIG. 4, one or two crew members may grasp the support rods 120 and lift the filter bag 116 from the housing member 104. As further shown in FIG. 4, when filter bag 118 is removed from the housing member 104, the support frame 122 remains within the housing 104. The preferred shape of the support frame 122 is the A-frame style indicated in FIG. 4. In this manner, the support frame 122 provides the necessary elevation so that the end of the filtered bag and the change-filter indicator strip 148, FIG. 3, is situated at a desired height within the housing 104 so that it is substantially always submerged under ballast water during the filtration process to provide an accurate indication of the amount of particulate matter filtered during the filter operation.

As further illustrated in FIG. 4, the top edge of the housing member 104 is provided with support rod notches 150 that are located to position support rods 120 in a desired parallel fashion as indicated in FIG. 3. The support rod notches 150 also secure the rods during use of the device.

Figure 5:
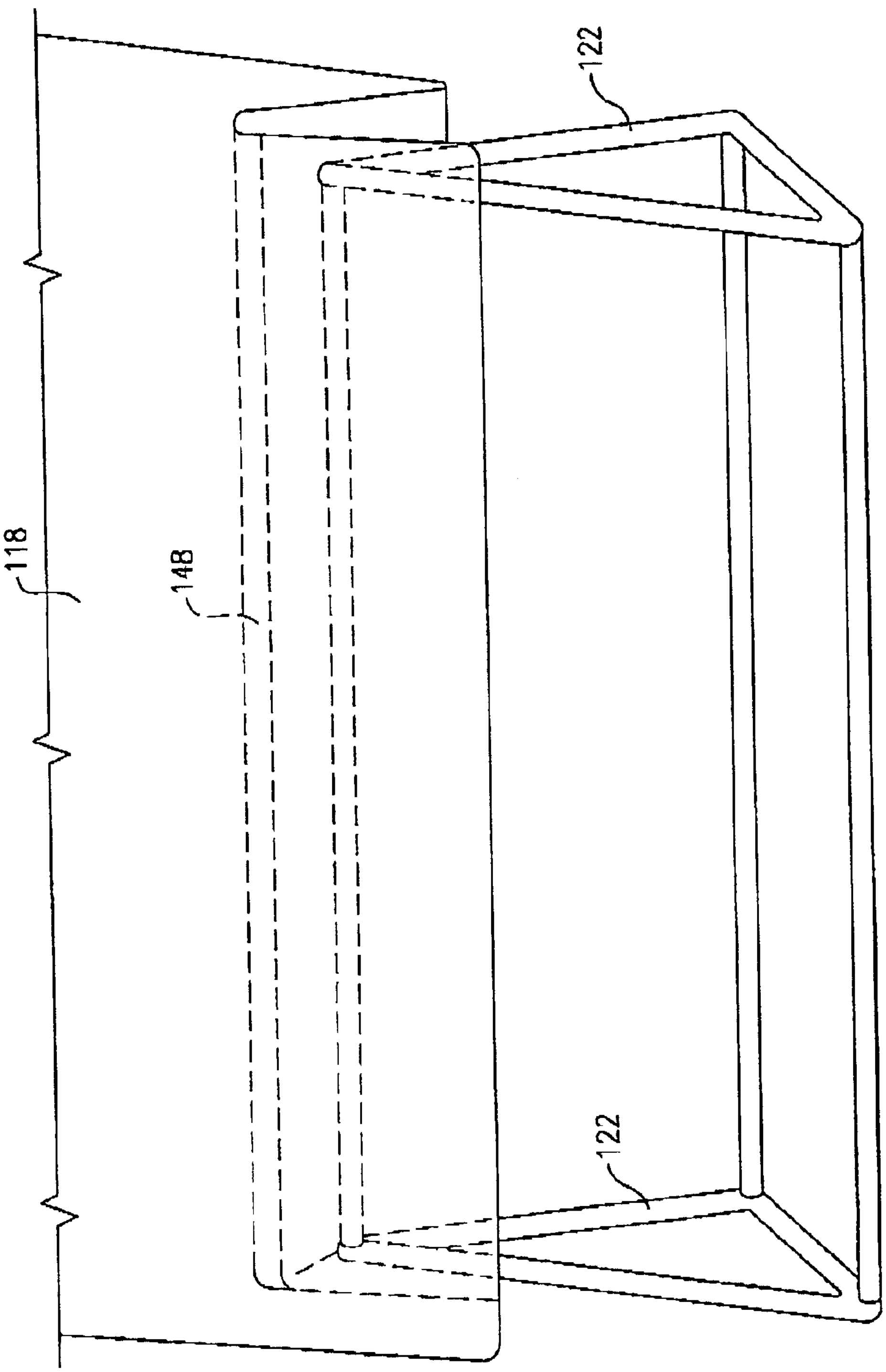
FIG. 5 is an enlarged detailed perspective view of the filter frame support structure and bag assembly illustrated in FIG. 4.

FIG. 5 is an enlarged detailed perspective view of the filter frame support structure 122 and filter bag 118. As illustrated, as the filter bag 118 is loaded into the apparatus, the support frame 122 provides a structure that positions the indicator strip 148 at a desired location above the first platform 124 shown, for example, in FIG. 4. In this manner, not only does the indicator strip 148 result in being positioned in a desired height above the first platform 124, the surface area of the filter bag is thereby increased thus giving increased flow-through and filtering effect during the filtering operation.

Figure 6:
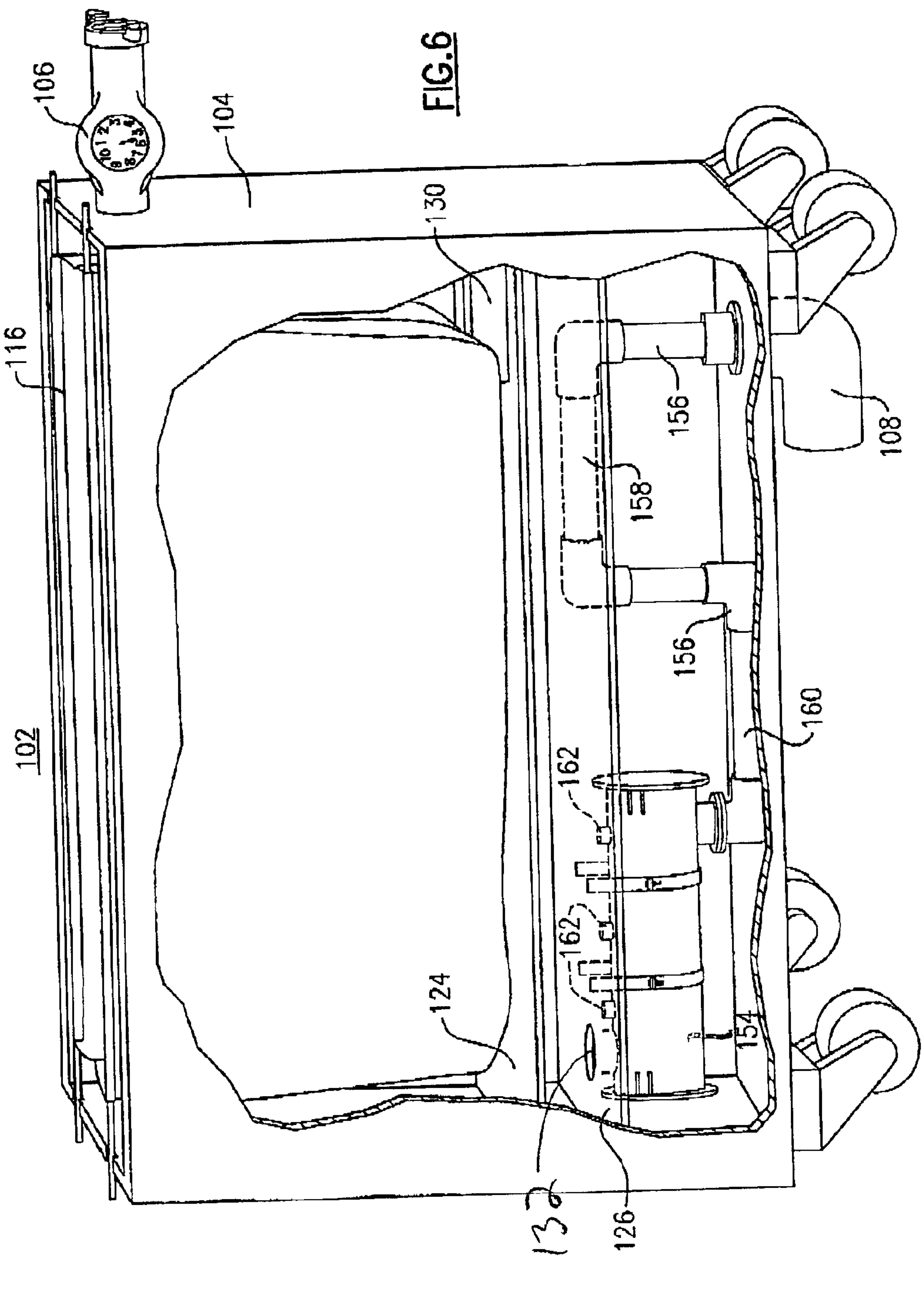
FIG. 6 is a perspective cut-away view of another embodiment of the ballast water treatment apparatus according to the present invention.
Figure 7:
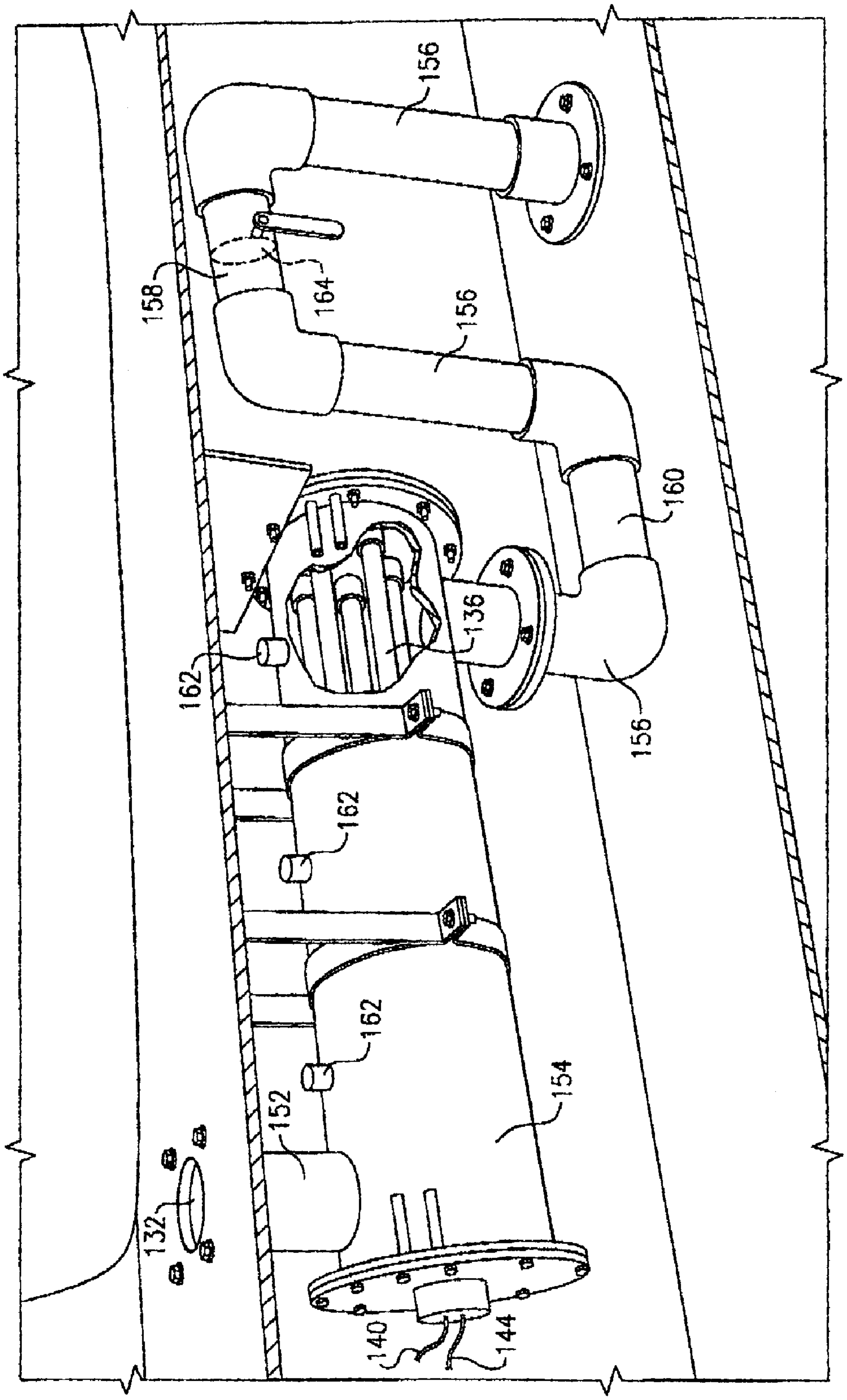
FIG. 7 is an enlarged detailed perspective view of a water treatment tank and related piping as utilized in conjunction with the embodiment of the present invention illustrated in FIG. 6.

With reference next to FIGS. 6 and 7, there is shown an alternate embodiment of the ballast water treatment apparatus 102 according to the present invention. In the embodiment illustrated in FIG. 6, the upper chamber is substantially similar to that discussed in connection with FIGS. 1–5. As illustrated, this embodiment of the apparatus 102 includes the filter apparatus 116, and the housing member 104 having an inlet port 106 and discharge port 108. This embodiment of the present invention also includes a first platform 124 and a second platform 126. This embodiment also similarly includes the first flow aperture 130 provided in the first platform 124 and a second flow aperture 132 formed in the second platform 126. As illustrated, the first flow aperture 130 is rectangular in shape while the second flow aperture 132 in this embodiment is circular to conform to an inlet pipe 152 shown in FIG. 7. As illustrated in FIGS. 6 and 7, this embodiment of the present invention includes a treatment tank 154. The treatment tank 154 includes the UV lamps 136. Depending on the application of the energy required, anywhere between one and eight UV lamps extending the entire length of the treatment tank 154 are preferably desired. The tank 154 is further provided with discharge piping 156. As illustrated in FIG. 6, the discharge piping 156 is fluidly connected to the discharge port 108. The discharge piping 156 includes a trap portion 158 which is situated above the highest water level attainable within the tank 154. In this manner during non-use, water will be maintained within a pipe segment 160 to thereby prevent undesired back-flow. The treatment tank 154 is similarly provided with an electrical power supply 144 and an electrical feedback connection 140. In this specific embodiment of the apparatus as illustrated in FIG. 7, the treatment tank 154 is further provided with heat sensors 162. The electrical feedback connection 144 and electrical power supply 144 are similarly connected to a control box 142 as illustrated in FIG. 2. In this embodiment, the heat sensors 162 are similarly connected to the control box 142. The heat sensors detect the temperature of the filtered water as it passes through the treatment tank 154. In one preferred embodiment, once the UV bulbs 136 reach a desired temperature, they will heat the water and thereby deactivate any biological organisms contained within the ballast water as it passes through the tank 154. In this embodiment, both UV radiation and heat are employed as indicated to deactivate any biological organisms contained within the ballast water.

To prevent premature discharge of filtered water from the treatment tank 154 through the discharge port 108, this embodiment of the present invention is provided with a solenoid-activated valve 164 which is similarly electrically connected to the control box 142. In this manner, the valve 164 is not opened until the water temperature within the tank 154 reaches a pre-determined processing temperature. In one preferred embodiment, the required bulb temperature for water treatment is 125° F. In this embodiment low pressure UV lamps are employed to achieve the desired temperature. In another preferred embodiment of this aspect of the present invention, high pressure UV lamps are utilized to achieved a water temperature of 400° F. Thus during use of the apparatus illustrated in FIGS. 6 and 7, discharge flow is not permitted until the temperature in tank 154 reaches a predetermined desired temperature set to effectively kill or otherwise deactivate any biological microorganisms contained within the ballast water. As with the embodiment of the ballast water treatment apparatus 102 discussed in connection with FIG. 1–4, the UV lamps utilized in the embodiment shown in FIGS. 6 and 7 are preferably 2000 watts (2 KW) with an operating voltage of 1,454 AC running at 1.35 amps. In one specific implementation, six UV lamps of this particular rating are preferred.

Figure 8:
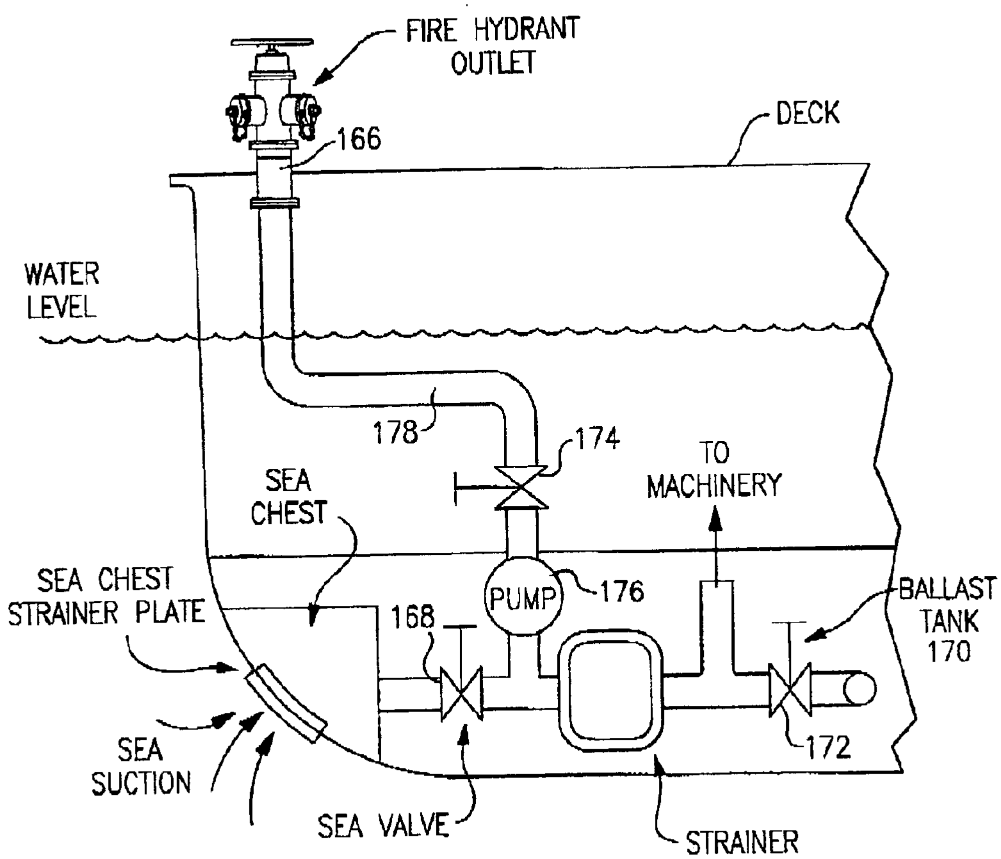
FIG. 8 is a typified diagrammatic cross-sectional representation of a ship's ballast tank and related mechanical piping as adapted for use with the ballast water treatment apparatus according to the present invention.

Referring now to FIG. 8, there is shown a schematic cross-sectional side view of a typical ship's ballast tank and first main deck. As represented schematically, the main deck includes a fire hydrant outlet 166 as indicated. During the process of loading sea water into the ship for ballast, the sea chest and sea valve 168 are open to allow sea water to enter the ballast tanks 170. To allow sea water into the ballast tank, ballast tank valve 172 is typically provided to control the flow of sea water into the ballast tank. A strainer is provided to remove any large particulate matter from the sea water as it enters the ballast tank 170 from the sea chest through the sea valve 168 and into the ballast tank 170 through the ballast tank valve 172. As indicated in FIG. 8, the sea water mechanical system also typically includes a fire hydrant system main valve 174. During use of the apparatus of the present invention, the sea valve 168 is closed while the ballast tank valve 172 is opened. A pump 176 is activated to pump sea water from the ballast tank 170 up through pump 176 and through the connecting piping 178 to feed the fire hydrant outlets 166 with sufficient pressure. Thus in this manner, the apparatus of the present invention may advantageously utilize the ballast water mechanical systems and the fire hydrant system of a ship to direct ballast water from the ballast tanks of a ship through the fire hydrant system to the fire hydrant outlets 166 on board the ship and then into the apparatus of the present invention.

Figure 9:
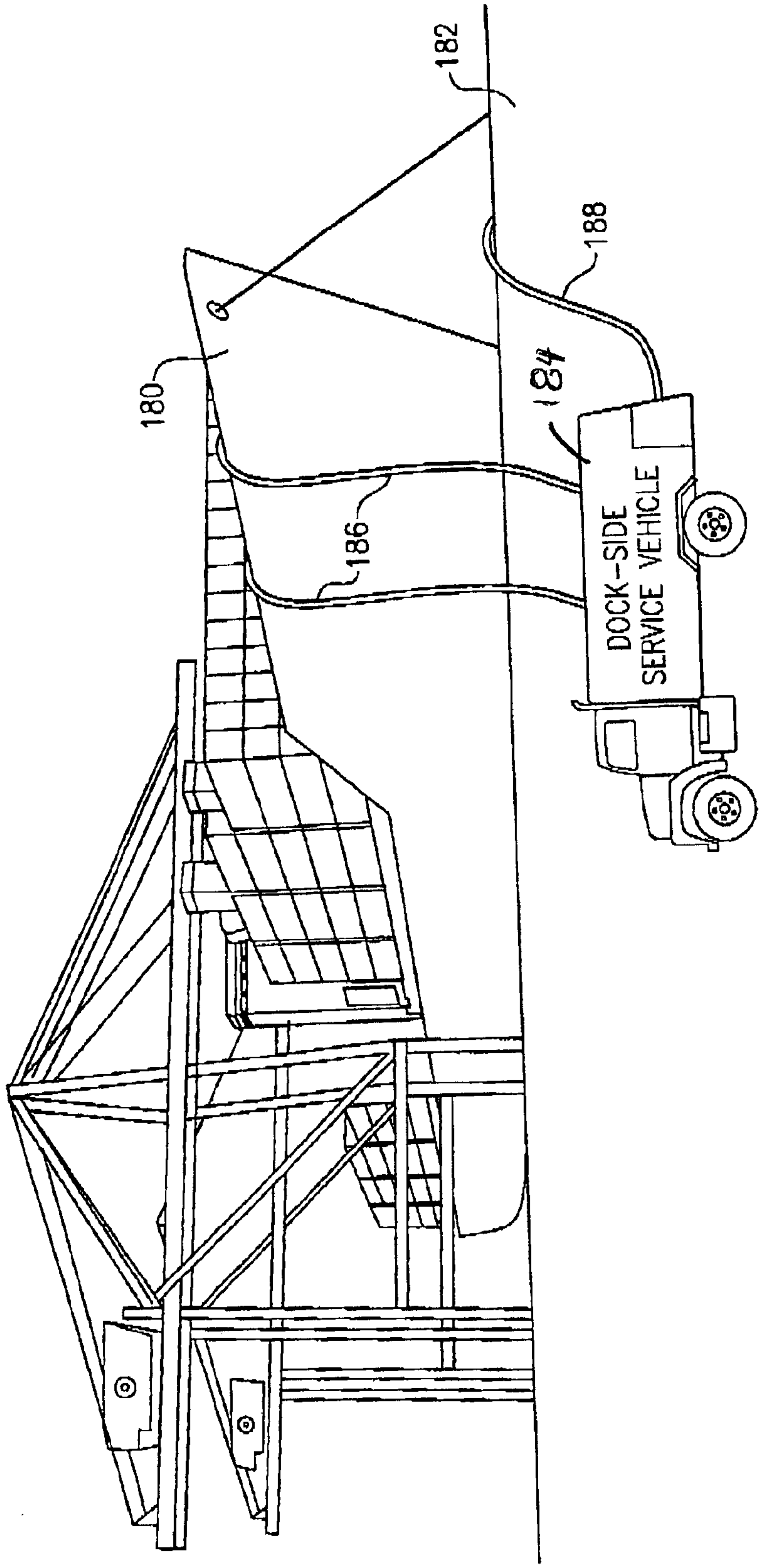
FIG. 9 is a perspective view of a container ship docked port-side for unloading that is also being serviced by a dock-side service vehicle according to the ballast water treatment aspects of the present invention and alternate methods relating thereto.

With reference now to FIG. 9, there is shown a typical container ship 180 docked in port alongside a dock 182. According to one aspect of the present invention, the ballast treatment apparatus 102 is mounted on a dock-side service vehicle 184. In accordance with one method of the present invention, the dock-side service vehicle 184 is positioned adjacent to the docked ship, in this case the container ship 180. Fire hoses 186 are then connected to the ship's fire hydrant outlets and directed overboard from the ship's deck to be secured to the ballast water treatment apparatus 102 contained on or secured to a suitable work space area provided preferably on the back of the dock-side service vehicle 184. The fire hoses 186 are then connected to the inlet ports 106 of the apparatus 102 and filtration and treatment of the ship's ballast water proceeds as described above. The dock-side service vehicle 184 contains a discharge pipe 188 which directs the filtered and treated water back into the harbor or port.

The inventors of the present invention have designed and contemplated many implementations of the ballast water treatment apparatus 102 for use in combination with the dock-side service vehicle 184. As indicated, the preferred embodiment of the dockside vehicle 184 is a modified, small tank truck that has a filter apparatus contained therein and the UV lamps positioned within the truck-mounted tank or tanks. Thus in this manner, the truck-mounted tanks are completely self-contained and include a suitable number of inlet ports 106 designed to readily quick connect to the ends of fire hoses provided from the ship's fire hydrants.

With continuing reference to FIG. 9, the inventors hereof have specifically provided a method of treating discharged ballast water from the ship 180 using the dock-side service vehicle 184. This method includes the steps of providing a ballast water treatment apparatus on the dock-side service vehicle 184, positioning the service vehicle 184 adjacent the ship 180, and directing ballast water from a ballast tank of the ship 180 into the ballast water treatment apparatus on the dock-side service vehicle 184 to thereby treat the ship's ballast water before discharging the ship's ballast water into an open water environment. In this method, the respective ship's ballast water may be directed from the ballast tank through the ship's fire hydrant system and into the ballast water treatment apparatus on the dock-side service vehicle 184. The method may include the further step of connecting at least one fire hose 186 between a fire hydrant outlet on the deck of the ship 180 and an inlet port provided on the ballast water treatment apparatus on the dockside service vehicle 184.

The inventors hereof have further provided a method of deriving financial revenue for services provided for treating discharged ballast water from the ship 180 using the dock-side service vehicle 184. This method includes the steps of (1) positioning the dockside service vehicle 184 adjacent the ship 180, (2) directing ballast water from a ballast tank of a ship 180 into a ballast water treatment apparatus maintained on the dock-side service vehicle 184 to thereby treat the ship's ballast water before discharging the ship's ballast water into an open environment, (3) determining an amount of time required to treat the ship's ballast water, and (4) calculating a water treatment service fee based on the amount of time required to treat the ship's ballast water.

There is also provided another method of deriving financial revenue for services provided for treating discharged ballast water from a ship using the dock-side service vehicle 184. This method includes the steps of (1) positioning the dock-side service vehicle 184 adjacent ship 180, (2) directing ballast water from a ballast tank of the ship into a ballast water treatment apparatus maintained on the dock-side service vehicle 184 to thereby treat the ship's ballast water before discharging the ship's ballast water into an open environment, (3) determining a total volume of treated ballast water processed from the ship's ballast water tanks, and (4) calculating a water treatment service fee based on the total volume of treated ballast water.

Figure 10:
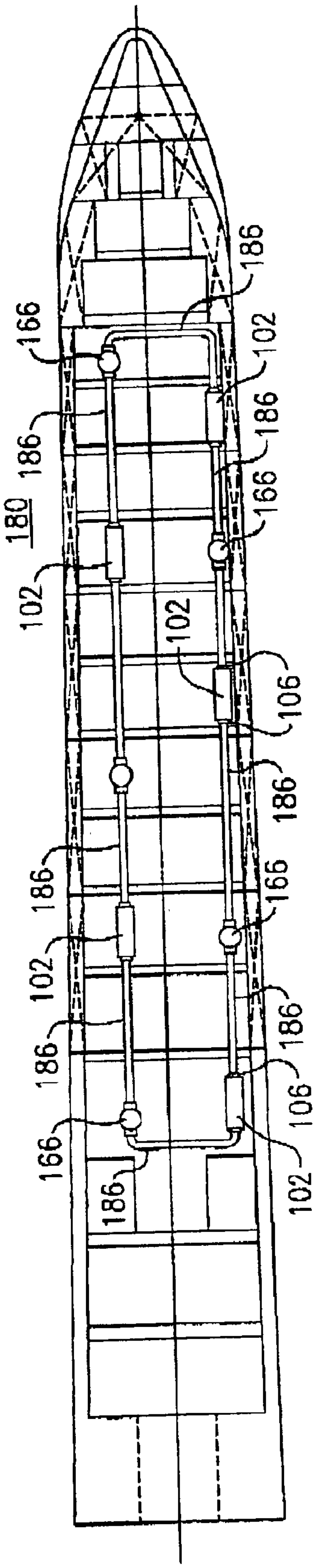
FIG. 10 is a deck plan of the container ship illustrated in FIG. 9 showing the location of the ship's second deck fire hydrants.
Figure 11:
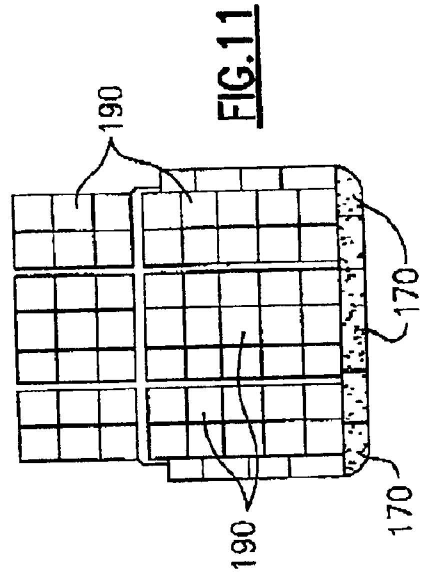
FIG. 11 is a cross-sectional view of the container ship illustrated in FIG. 9 showing the ballast tank area relative to cargo space.
Figure 12:
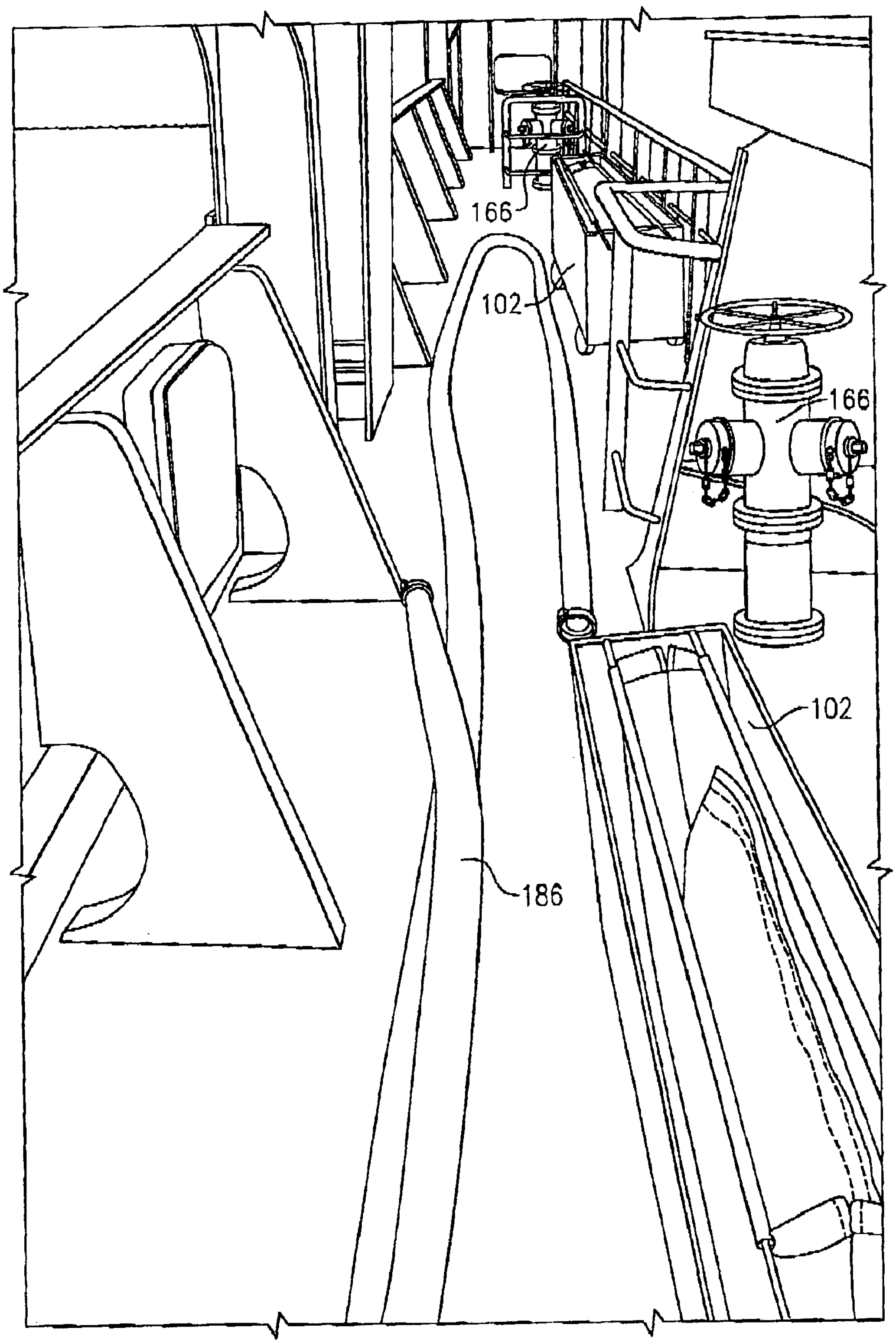
FIG. 12 is perspective view along the second deck of a typical container ship illustrating the placement of ballast water treatment apparatus according to the present invention.

Referring next to FIG. 10, there is shown the deck plan of the typical container ship 180 and the location of the fire hydrant outlets 166. FIG. 11 shows the ballast tank areas 170 relative to the cargo areas represented by reference numeral 190. The typical cargo container ship 180 will carry a known amount of sea water for ballast. Thus if it is desired to completely treat and filter the ballast water in accordance with the methods of the present invention, the number of available fire hydrant outlets 166 may be determined along with flow rates thereof and the known flow rates of the ballast water treatment apparatus 102 to completely filter the entire ship's ballast water within a predetermined maximum amount of time. As represented diagrammatically in FIG. 10, a number of ballast water treatment apparatus 102 are distributed around the ship's main deck or second deck adjacent fire hydrant outlets 166. The ship's fire hydrant as indicated in FIG. 8 typically includes one outlet. According to one aspect of the present invention, ships with one outlet fire hydrants many be equipped with a Y-adaptor to thereby provide two outlets. Both of these outlets may be employed to direct ballast water into the ballast water treatment apparatus 102. Alternatively one outlet may be employed with the apparatus 102 while the other is reserved for use in case it is needed in a fire emergency. Thus according to one preferred method of this invention, two hoses may be connected to each of the fire hydrants 166 and directed to adjacent ballast water treatment devices 102 as interconnected by the ship's fire hoses 186. As represented in FIG. 10, the series connected arrangement of fire hydrants 166 feeding two adjacent ballast water treatment apparatus 102 will utilize the full flow-through rate of the fire hydrant system of the ship to filter and treat the ship's ballast water according to this aspect of the present invention in a minimum amount of time. FIG. 12 next illustrates a perspective pictorial representation of this multi-hydrant and multi-apparatus method.

Figure 13:
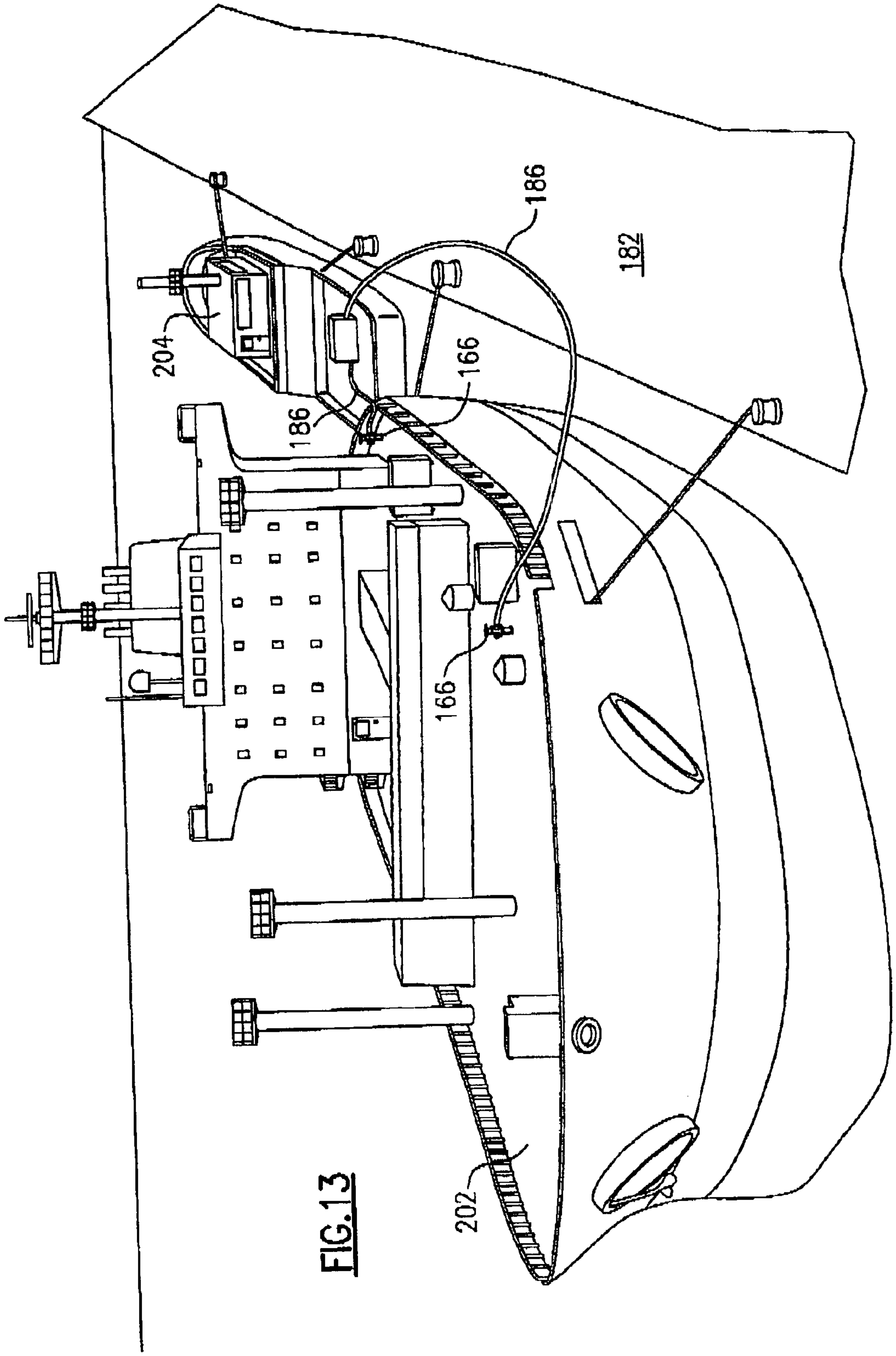
FIG. 13 is a perspective view of a tanker docked port-side for loading or unloading that is also being serviced by an in-port service vessel according to the ballast water treatment aspects of the present invention and additional methods relating thereto.

Turning now to FIG. 13, there is shown a perspective view of a typical tanker 202 situates dockside in a port-of-call. As indicated in FIG. 13, the main deck of the tanker 202 includes a number of fire hydrant outlets 166. In accordance with another aspect of the present invention, there is provided an in-port service vessel 204 which is out-fitted with a ballast water treatment apparatus 102 according to the present invention. Thus in accordance with alternate methods of the present invention, the in-port service vessel 204 may be employed to pull alongside a docked ship and provide ballast water filtration and treatment services. For example, as illustrated in FIG. 13, a tanker 202 may be required by local, state, national, or international regulations to have the ship's ballast water treated before its ballast water is discharged into the port or harbor. Thus in accordance with this method of the present invention, the ship's fire hoses 186 are connected to the main deck's fire hydrants 166 and directed to the in-port service vessel 204 as represented in FIG. 13. The in-port service vessel 204 may be a barge type vessel or tug boat type vessel utilized to provide the water filtering and treating service to a ship. According to alternate methods of this embodiment, neither the ship nor the service vessel 204 need necessarily be dockside. The ship may be anchored in port or alternatively, even serviced in this manner in open waters or on the high seas before entering port.

Thus in continuing reference to FIG. 13, the inventors hereof have provided a method of treating discharged ballast water from a ship using the in-port service vessel 204. This method includes the steps of (1) providing a ballast water treatment apparatus 102 on board the service vessel, (2) positioning the service vessel adjacent the ship 202 requiring ballast water treatment, (3) and directing ballast water from a ballast tank of the ship 202 into the ballast water treatment apparatus 102 on board the service vessel 204 to thereby treat the respective ship's ballast water before discharging the ship's ballast water. In this method, the ship's ballast water is directed from the ballast tank through the ship's fire hydrant system and into the ballast water treatment apparatus on board the service vessel 204. The method may include the further step of connecting at least one fire hose 186 between the fire hydrant outlet 166 on the deck of the ship 202 and an inlet port provided on the ballast water treatment apparatus on board the service vessel.

Accordingly, there is also provided a method of deriving financial revenue for services provided for treating discharged ballast water from a ship using the in-port service vessel 204. This method includes the steps of positioning the service vessel 204 adjacent the ship 202 requiring ballast water treatment; directing ballast water from a ballast tank of the ship 202 into a ballast water treatment apparatus maintained on board the service vessel 204 to thereby treat the ship's ballast water before discharging the ship's ballast water into the environment; determining an amount of time required to treat the ship's ballast water; and calculating a water treatment service fee based on the amount of time required to treat the ship's ballast water.

There is further provided another method of deriving financial revenue for services provided for treating discharged ballast water from the ship 202 using the in-port service vessel 204. This method includes the steps of positioning the service vessel 204 adjacent the ship 202 requiring ballast water treatment; directing ballast water from a ballast tank of the ship 202 into a ballast water treatment apparatus maintained on board the service vessel 204 to thereby treat the respective ship's ballast water before discharging the ship's ballast water into the environment; determining a total volume of treated ballast water processed from the respective ship's ballast water tanks; and calculating a water treatment service fee based on the total volume of treated ballast water.

Figure 14:
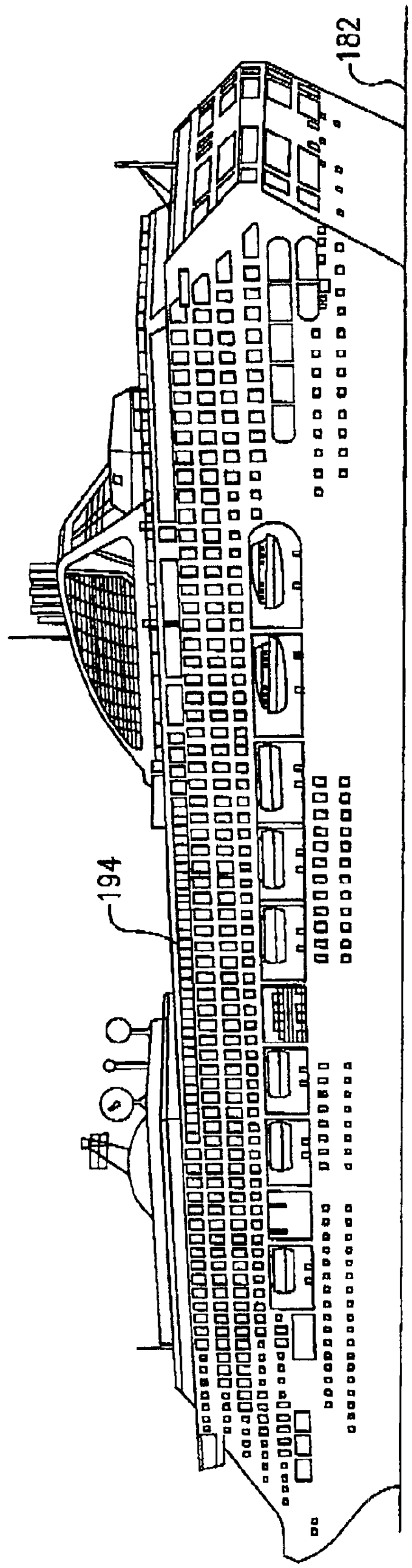
FIG. 14 is a perspective view of a passenger cruse ship docked port-side for loading or unloading.

Referring next to FIG. 14, there is shown a perspective view of a typical cruise ship 194 in port dockside for loading or unloading passengers, cargo, and supplies. As discussed in connection with FIGS. 9, 10, and 11, the cruise ship 184 may be similarly serviced by the dock-side service vehicle 184 or alternatively carry on-board a desired number of ballast water treatment apparatus 102 for on-ship deck hands to filter and treat the ship's ballast water according to the methods discussed above. In addition thereto, cruise ship 194 may have its ballast water treated by the in-port service vessel 204 discussed above.

Figure 15:
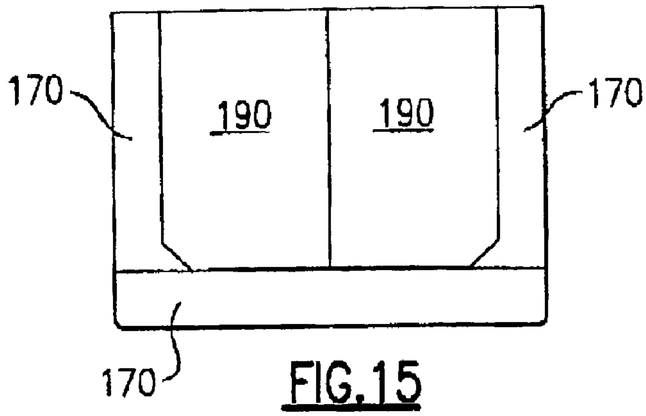
FIG. 15 is a cross-sectional view of the tanker shown in FIG. 13 illustrating the ballast tank area relative to cargo space.
Figure 16:
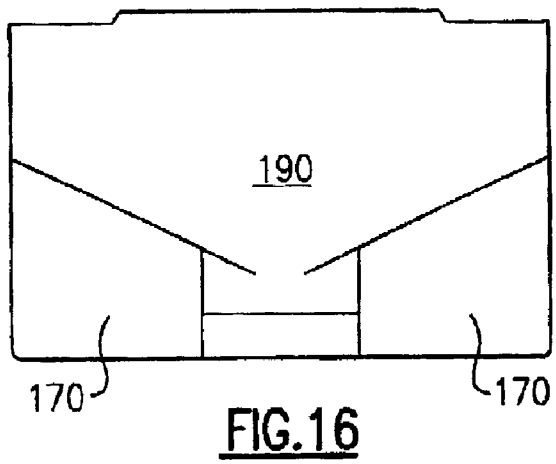
FIG. 16 is a cross-sectional view of an intermediate class Great Lakes bulk vessel showing the ballast tank area relative to cargo space.
Figure 17:
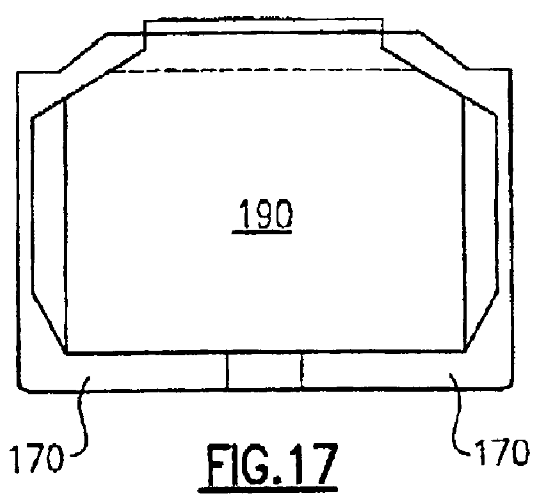
FIG. 17 is a cross-sectional view of a Panamax size oil bulk ore carrier representing the ballast tank area relative to cargo space.

FIG. 15 is a cross-sectional view of the tanker illustrated in FIG. 13 illustrating the ballast tank area 170 relative to cargo space 190. FIG. 16 is a cross-sectional view of an intermediate class Great Lakes bulk vessel showing the ballast tank area 170 relative to cargo space 190. FIG. 17 is a cross-sectional view of a Panamax size oil bulk ore carrier representing the ballast tank area 170 relative to cargo space 190. In each of these three different types of ships, typically the weight of the cargo loaded on or off the ship is approximately made equal to the weight of ballast water used to counter-balance the ship in accordance with known methods for loading and unloading ships. In these types of ships, ordinarily, a relatively larger volume of ballast water is discharged during loading as compared to the typical container ship illustrated, for example, in FIG. 9. Nonetheless, the apparatus 102 and methods of the present invention utilizing either the dock-side service vehicle 184 or the in-port service vessel 204 may be readily scaled up to meet the volume of ballast water typically discharged by these types of ships.

Figure 18:
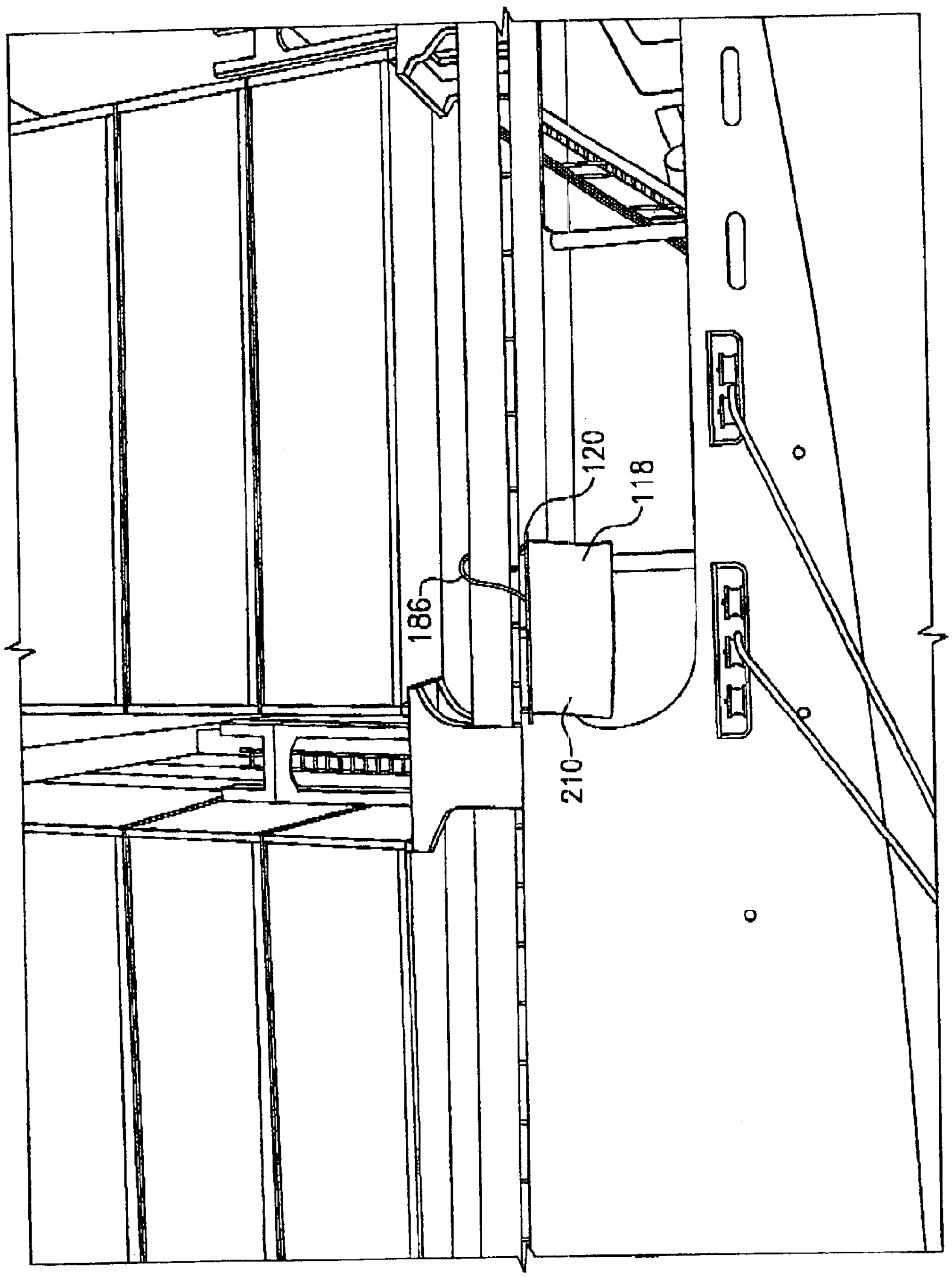
FIG. 18 is a perspective view of another embodiment of the present invention illustrating the use thereof as positioned on the side of a typical container ship.

With reference now to FIG. 18, there is shown an alternate embodiment of the ballast water treatment apparatus of the present invention. A ballast water filtration apparatus 210 is shown in FIG. 18. The ballast water filtration device 210 similarly includes a filter bag 118 and support rods 120. In this embodiment, the support rods 120 are provided with members to hook over the side of the ship as illustrated in FIG. 18. In use, a fire hose 186 is connected to the fire hydrant on the ship's deck and the open end of the fire hose 186 is simply placed in the filter bag 118 as illustrated. Thus in this embodiment of the present invention, there is provided a very simply and economically cost effective filtration apparatus and method.

Figure 19:
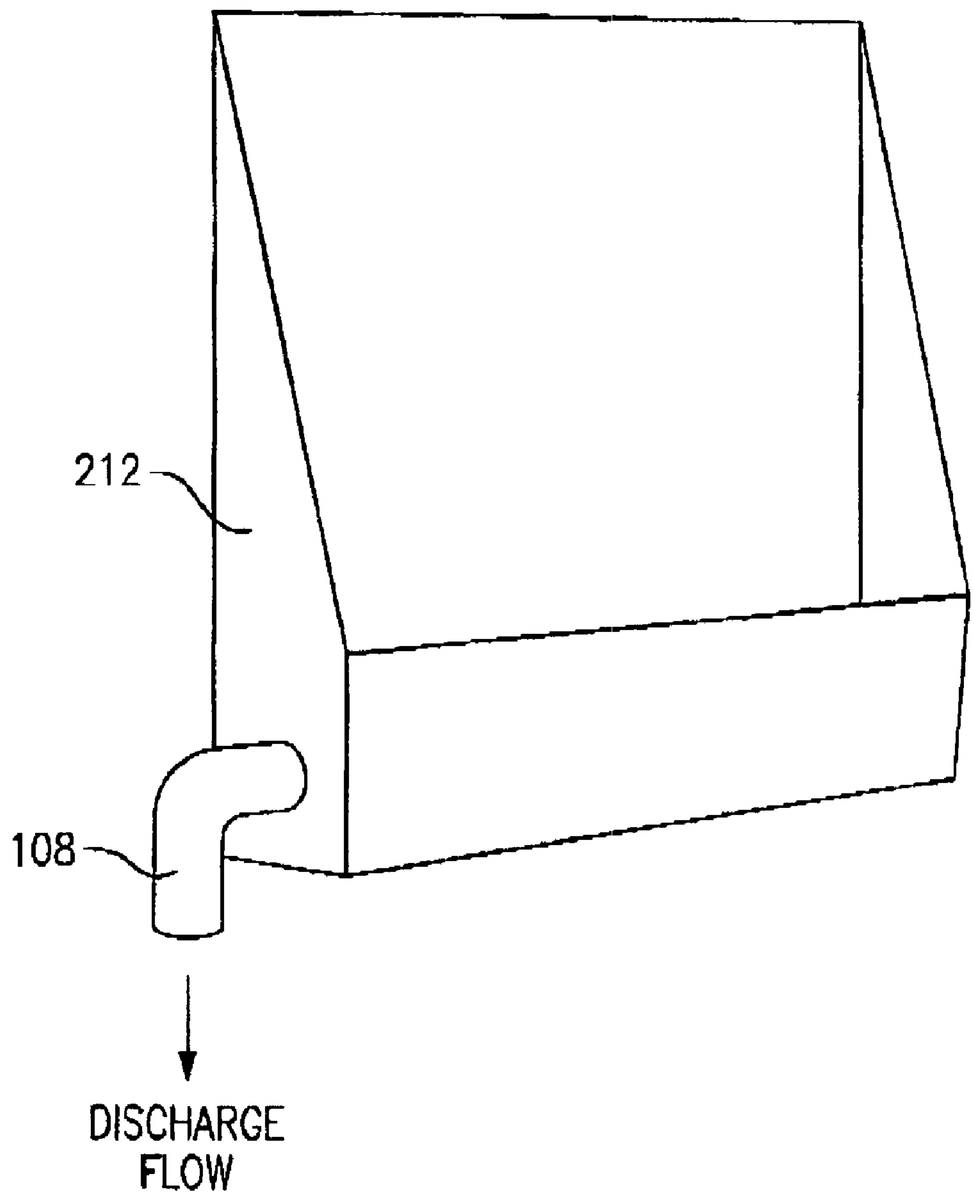
FIG. 19 is a perspective view of a half-face housing member that may be employed in combination with the ballast water treatment apparatus illustrated in FIG. 18.

FIG. 19 shows a half-face housing member for the ballast water filter apparatus 210 illustrated in FIG. 18. The half-face housing member 212 illustrated in FIG. 19 may be employed in conjunction with the ballast water filter apparatus 210 shown in FIG. 18 to provide a directed outlet flow as indicated in FIG. 19. The half-faced housing is similarly provided with the discharge port 108 to direct the water downwardly into the harbor. The discharge port 108 may similarly have adapted thereto the discharge hose 110 illustrated in FIG. 1 to thereby further direct the filtered ballast water into the open water environment of the harbor or port.

Figure 20:
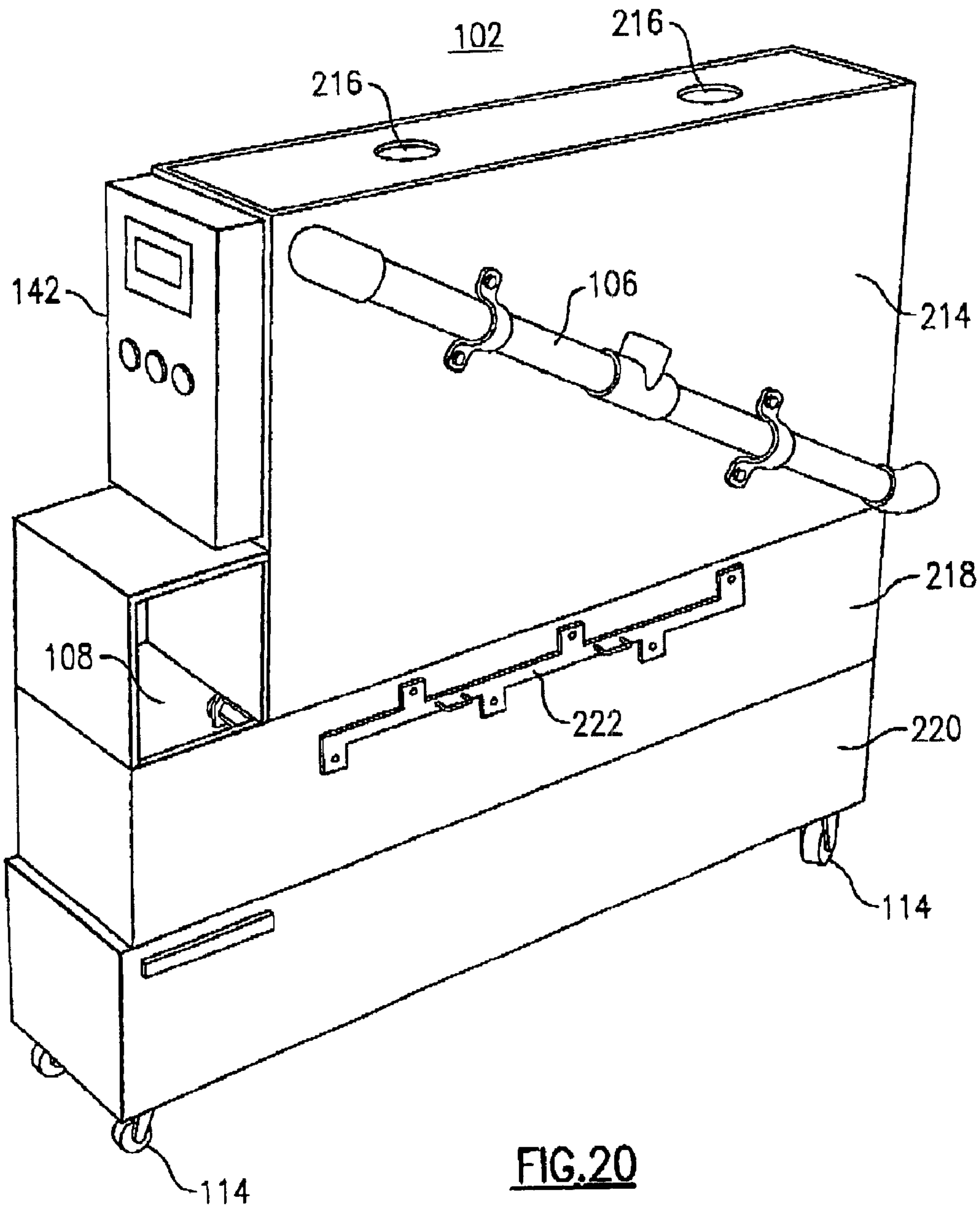
FIG. 20 is a perspective view of yet another embodiment of the ballast water treatment apparatus according to the present invention.
Figure 21:
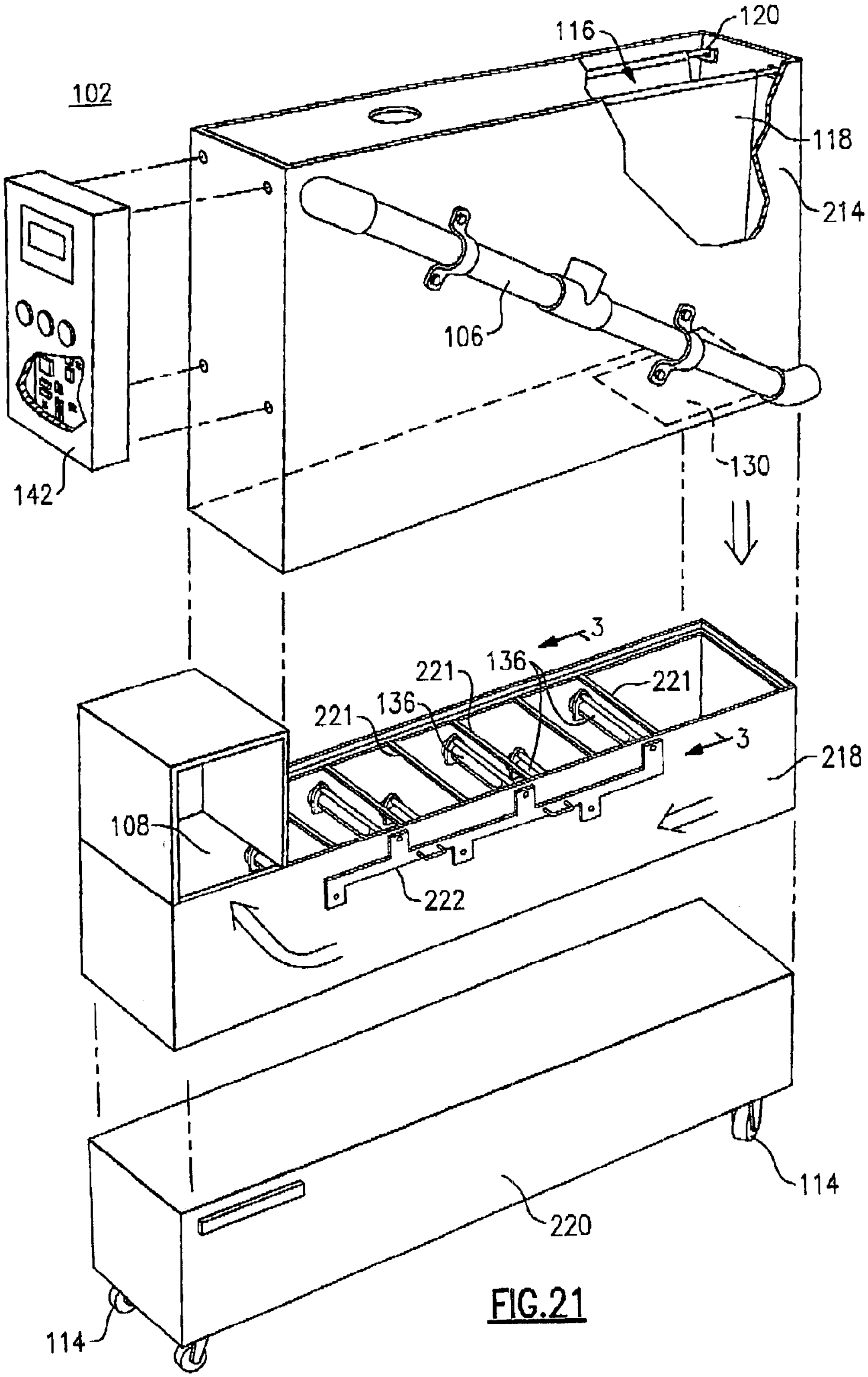
FIG. 21 is an exploded view of the ballast water treatment apparatus illustrated in FIG. 20 including break-away sections to show interior elements of principal components of the apparatus.

With reference next to FIGS. 20 and 21, there is shown a perspective view of yet another embodiment of the ballast water treatment apparatus 102 according to the present invention. FIG. 21 in particular is an exploded view of the ballast water treatment apparatus 102 illustrated in FIG. 20 including break-away sections to show interior elements of principal components of the apparatus 102. In this embodiment shown in FIGS. 20 and 21, the apparatus 102 includes a filtration unit 214, a UV containment vessel or compartment 218, and an electrical compartment 220. As illustrated, the filtration unit 214 includes a cap member having view ports 216. When in use, the cap member prevents ballast water from splashing out of the apparatus 102 while the view ports 216 provide viewing access to the interior of the filtration unit 214 during filtration operations. As further illustrated in FIG. 20, the filtration unit 214 includes the inlet port and associated piping 106 which may be implemented with a gallon meter at the T-junction shown. To further increase the intake flow, the filtration unit 214 may be outfitted with two inlet ports and associated piping 106, one such situated as illustrated and the other similarly installed on the reverse-side or back-side of the unit 214 as shown. The UV compartment 218 includes the UV lamps 136 which in this embodiment are positioned within the UV compartment 218 by use of a pair of UV bulb mounting brackets 222.

As shown in FIG. 21, the UV compartment 218 includes UV sensors 221 which are employed to detect the UV output of the bulbs 136. As shown, the apparatus 102 illustrated in FIGS. 20 and 21 includes the control box 142 that is implemented to similarly control operations of the apparatus as discussed above in connection with the embodiment of the apparatus 102 illustrated in FIGS. 1–5. In the embodiment illustrated in FIGS. 20 and 21, the electrical compartment may include additional components to provide further operations and functions to the apparatus 102.

In operation, a fire hose connected to the ship's fire hydrant at one end is connected at its other end to the inlet piping 106. Ballast water then travels from the lower right area of the filtration unit 214 as illustrated to the upper left thereof to then be directed and discharged into the filter apparatus 116. The ballast water then drains through the filter 116 to thereby remove particulate matter as small as 1 micron. The filtered ballast water then exits the filtration unit 214 through the first flow aperture 130 and is directed into the UV compartment 218 for UV treatment. As the UV compartment 218 fills with filtered ballast water at one end, filtered water is then directed to the other end thereof toward the discharge port 108. As the filtered water flows along in the UV compartment 218 toward the discharge port 108, the UV lamps are activated to treat the filtered water so that any micro-organisms, viruses, or bacteria that may have remained in the ballast water after the filtration step are thereby deactivated by UV treatment. The general direction of flow is indicated by the wide arrows shown in FIG. 21.

In the embodiment illustrated in FIGS. 20 and 21, the UV lamps 136 are situated substantially perpendicular to the flow of ballast water. In one particular preferred embodiment of the UV compartment 218, the UV lamps 136 utilized therein are 3000 KW lamps operating at 220 VAC and 30 Amps. In one such preferred embodiment, six UV lamps 136 are employed. While in other embodiments, the number of UV lamps 136 may vary depending on the desired flow rate, type of ballast water, and desired deactivation or "kill" effectiveness.

Figure 25:
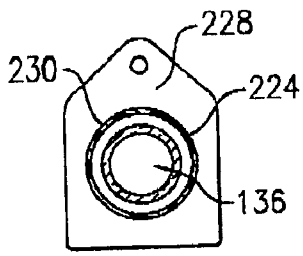
FIG. 25 is a detailed isolated elevation view of a wiper plate employed in the tube wiper system illustrated in FIGS. 22–24.
Figure 22:
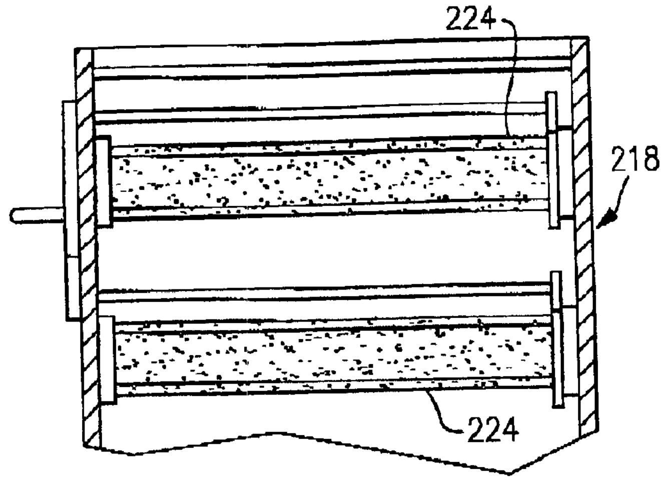
FIG. 22 is a detailed partial plan view of the UV lamp assembly utilized in conjunction with the ballast water treatment apparatus shown in FIG. 20 illustrating build-up of UV-irradiated biological material on the lamp assembly.
Figure 23:
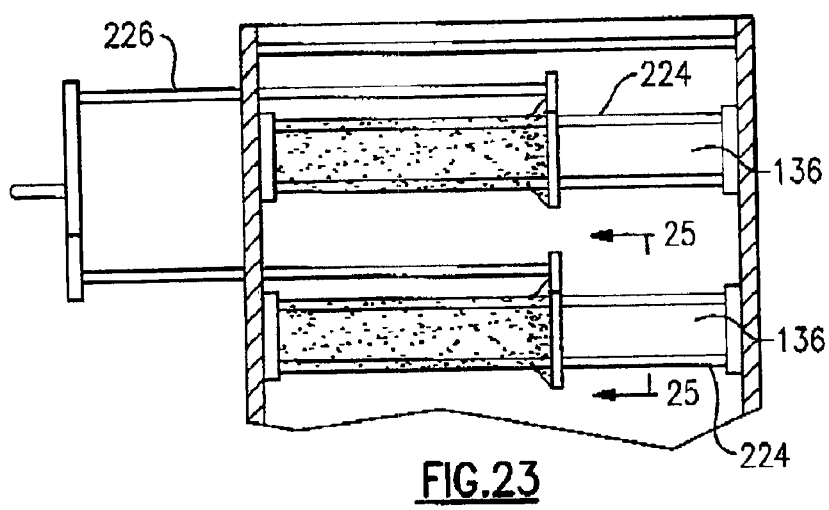
FIG. 23 is a view similar to FIG. 22 showing a tube wiper system and actuator assembly cleaning the build-up of UV-irradiated biological material on the lamp assembly according to another aspect of the present invention.
Figure 24:
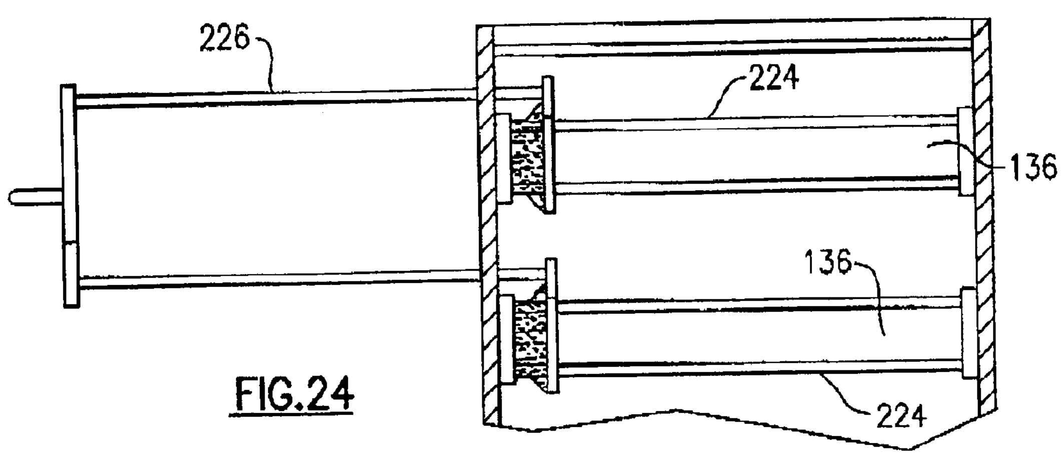
FIG. 24 is a view similar to FIG. 23 showing the lamp assembly in a fully cleaned or wiped condition after full activation of the tube wiper system.

FIG. 22 is a detailed partial plan view of a UV lamp assembly utilized in conjunction with the ballast water treatment apparatus shown in FIGS. 20 and 21. FIG. 22 illustrates build-up of UV-irradiated biological material on the lamp assembly. FIG. 23 is a view similar to FIG. 22 showing a tube wiper system and actuator assembly 226 cleaning the build-up of UV-irradiated biological material on the lamp assembly according to another aspect of the present invention. FIG. 24 is a view similar to FIG. 23 showing the lamp assembly in a fully cleaned or wiped condition after full activation of the tube wiper system 226. FIG. 25 is a detailed isolated elevation view of a wiper or face plate 228 employed in the tube wiper system 226 illustrated in FIGS. 22–24.

As illustrated in FIGS. 22–24, each UV lamp 136 is enclosed in a transparent sleeve 224. When the filtered ballast water is treated in the UV compartment, deactivated particulate matter may build up on the transparent sleeves 224. As this build-up of particulate matter increases in thickness, the effect of the UV lamps will be diminished. Thus the UV sensors 221 are employed to detect the UV output of each associated bulb. Once the UV lamp output decreases below a certain set threshold, the cleaning actuator 226 is activated to wipe clean the transparent lamp sleeves 224. This wiping effect is achieved by use of a rubber wiper washer 230, FIG. 25, which snuggly fits around the sleeve 224 as illustrated. After activation, the sleeve is wiped clean and the UV effectiveness is returned to a maximum. The control box 142 and electrical compartment 220, FIGS. 21 and 22, are implemented with operational features that control sleeve cleaning or wiping in a desired manner.

While this invention has been described in detail with reference to certain preferred embodiments and aspects thereof, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A method of distributing portable water treatment devices around the deck of a ship to process ballast water discharged from the fire hydrant system of the ship, each of said water treatment devices having a known processing rate, said method comprising the steps of:

determining the number and location of fire hydrant outlets on the deck of a ship;

ascertaining the flow rate of each of said located fire hydrant outlets;

determining an amount of said ship's ballast water requiring treatment;

setting a maximum duration of time during which the determined amount of ballast water requiring treatment is to be processed;

determining the number of water treatment devices necessary to process the determined amount of ballast water within said maximum duration of time; and distributing said determined number of water treatment devices around said deck of said ship proximate selected fire hydrant outlets to direct ballast water from said fire hydrant outlets into respective water treatment devices for processing.

2. A marine service vessel for treating discharged ballast water from a ship, said vessel comprising:

a water treatment processing area accessible to a respective ship docked in port;

a housing tank positioned within said water treatment processing area, said housing tank having at least one inlet port and one discharge port, said at least one inlet port being adapted to receive ballast water from the fire hydrant system of said respective ship by connecting a fire hose between a fire hydrant on said respective ship and said at least one inlet port of said housing tank;

a filter positioned within said housing tank, said filter employed to filter particulate matter from said of ballast water received from said respective ship's fire hydrant system; and a source of electromagnetic radiation maintained within said housing tank for irradiating said ballast water to thereby deactivate biological organisms contained therein.

3. A method of treating discharged ballast water from a ship using an in-port service vessel, said method comprising the steps of:

providing a ballast water treatment apparatus on board said service vessel;

positioning said service vessel adjacent a respective ship requiring ballast water treatment; and directing ballast water from a ballast tank of said respective ship into said ballast water treatment apparatus on board said service vessel to thereby treat said respective ship's ballast water before discharging said ship's ballast water.

4. The method according to claim 3 wherein said respective ship's ballast water is directed from said ballast tank through the ship's fire hydrant system and into said ballast water treatment apparatus on board said service vessel.

5. The method according to claim 4 including the further step of connecting at least one fire hose between a fire hydrant outlet on a deck of said respective ship and an inlet port provided on said ballast water treatment apparatus on board said service vessel.

6. A method of deriving financial revenue for services provided for treating discharged ballast water from a ship using an in-port service vessel, said method comprising the steps of:

positioning said service vessel adjacent a respective ship requiring ballast water treatment;

directing ballast water from a ballast tank of a respective ship into a ballast water treatment apparatus maintained on board said service vessel to thereby treat said respective ship's ballast water before discharging said ship's ballast water into the environment;

determining an amount of time required to treat said respective ship's ballast water; and calculating a water treatment service fee based on said amount of time required to treat said respective ship's ballast water.

7. A method of deriving financial revenue for services provided for treating discharged ballast water from a ship using an in-port service vessel, said method comprising the steps of:

positioning said service vessel adjacent a respective ship requiring ballast water treatment;

directing ballast water from a ballast tank of a respective ship into a ballast water treatment apparatus maintained on board said service vessel to thereby treat said respective ship's ballast water before discharging said ship's ballast water into the environment;

determining a total volume of treated ballast water processed from said respective ship's ballast water tanks; and calculating a water treatment service fee based on said total volume of treated ballast water.

8. A method of treating discharged ballast water from a ship using a dock-side service vehicle, said method comprising the steps of:

providing a ballast water treatment apparatus on said dock-side service vehicle;

positioning said service vehicle adjacent a respective ship requiring ballast water treatment; and directing ballast water from a ballast tank of said respective ship into said ballast water treatment apparatus on said dock-side service vehicle to thereby treat said respective ship's ballast water before discharging said ship's ballast water into an open water environment.

9. The method according to claim 8 wherein said ship's ballast water is directed from said ballast tank through the ship's fire hydrant system and into said ballast water treatment apparatus on said dock-side service vehicle.

10. The method according to claim 9 including the further step of connecting at least one fire hose between a fire hydrant outlet on a deck of said respective ship and an inlet port provided on said ballast water treatment apparatus on said dock-side service vehicle.

11. A method of deriving financial revenue for services provided for treating discharged ballast water from a ship using a dock-side service vehicle, said method comprising the steps of:

positioning said dock-side service vehicle adjacent a respective ship requiring ballast water treatment;

directing ballast water from a ballast tank of a respective ship into a ballast water treatment apparatus maintained on said dock-side service vehicle to thereby treat said respective ship's ballast water before discharging said ship's ballast water into an open environment;

determining an amount of time required to treat said respective ship's ballast water; and calculating a water treatment service fee based on said amount of time required to treat said respective ship's ballast water.

12. A method of deriving financial revenue for services provided for treating discharged ballast water from a ship using a dock-side service vehicle, said method comprising the steps of:

positioning said dock-side service vehicle adjacent a respective ship requiring ballast water treatment;

directing ballast water from a ballast tank of a respective ship into a ballast water treatment apparatus maintained on said dock-side service vehicle to thereby treat said respective ship's ballast water before discharging said ship's ballast water into an open environment;

determining a total volume of treated ballast water processed from said respective ship's ballast water tanks; and calculating a water treatment service fee based on said total volume of treated ballast water.

13. A method of processing ballast water discharged from a ship, said method comprising:

accessing ballast water requiring treatment from a ship's ballast tank through a fire hydrant system of said ship;

directing said ballast water from said fire hydrant system through a filter to thereby remove undesired particulate matter from said ballast water; and directing the filtered ballast water into an open water environment.

14. The method according to claim 13 including the further step of directing electromagnetic radiation at said ballast water before directing the filtered ballast water into said open water environment to thereby deactivate biological organisms contained within ballast water.

15. A method of using the fire hydrant system of a ship to treat ballast water, said method comprising the steps of:

accessing ballast water requiring treatment from a ship's ballast tank through a fire hydrant located on a deck of said ship;

directing said ballast water from said fire hydrant through a filter to thereby remove undesired particulate matter from said ballast water; and directing the filter ballast water into an open water environment.

16. The method according to claim 15 including the further step of directing electromagnetic radiation at said ballast water before directing the filtered ballast water into said open water environment to thereby deactivate biological organisms contained within ballast water.

* * * * *